US010852537B2

(12) United States Patent
Suzuki et al.

(10) Patent No.: US 10,852,537 B2
(45) Date of Patent: Dec. 1, 2020

(54) DISPLAY APPARATUS, MOVABLE BODY APPARATUS, PRODUCING METHOD OF THE DISPLAY APPARATUS, AND DISPLAY METHOD

(71) Applicants: Yuuki Suzuki, Kanagawa (JP); Kenichiroh Saisho, Tokyo (JP); Masato Kusanagi, Kanagawa (JP); Takuro Yasuda, Kanagawa (JP); Kazuhiro Fujita, Tokyo (JP); Keita Katagiri, Kanagawa (JP); Hiroshi Yamaguchi, Kanagawa (JP)

(72) Inventors: Yuuki Suzuki, Kanagawa (JP); Kenichiroh Saisho, Tokyo (JP); Masato Kusanagi, Kanagawa (JP); Takuro Yasuda, Kanagawa (JP); Kazuhiro Fujita, Tokyo (JP); Keita Katagiri, Kanagawa (JP); Hiroshi Yamaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

(21) Appl. No.: 16/316,288

(22) PCT Filed: Mar. 10, 2017

(86) PCT No.: PCT/JP2017/009689
§ 371 (c)(1),
(2) Date: Jan. 8, 2019

(87) PCT Pub. No.: WO2018/012031
PCT Pub. Date: Jan. 18, 2018

(65) Prior Publication Data
US 2020/0183157 A1 Jun. 11, 2020

(30) Foreign Application Priority Data
Jul. 14, 2016 (JP) .................... 2016-139286
Jan. 30, 2017 (JP) .................... 2017-014181

(51) Int. Cl.
B60Q 1/00 (2006.01)
G02B 27/01 (2006.01)
(Continued)

(52) U.S. Cl.
CPC .......... *G02B 27/0101* (2013.01); *B60K 35/00* (2013.01); *B60R 11/0229* (2013.01);
(Continued)

(58) Field of Classification Search
USPC ........................................ 340/435, 436, 905
See application file for complete search history.

(56) References Cited

U.S. PATENT DOCUMENTS 5,726,704 A    3/1998 Uomori
7,417,777 B2   8/2008 Saisho et al.
(Continued)

FOREIGN PATENT DOCUMENTS

EP    3031656 A1    6/2016
JP    H11-202256   7/1999
(Continued)

OTHER PUBLICATIONS

International Search Report and Written Opinion dated Aug. 23, 2017 in PCT/JP2017/009689 filed on Mar. 10, 2017.
(Continued)

Primary Examiner — Brent Swarthout
(74) Attorney, Agent, or Firm — Oblon, McClelland, Maier & Neustadt, L.L.P.

(57) ABSTRACT

An HUD apparatus is configured to irradiate light for forming an image on a transmissive reflector provided in a movable body, and to display a virtual image in a display area to overlap the virtual image with scenery outside the movable body. A given distance range in the scenery from a reference point that is set in the movable body is included in the display area, and a difference between a first conver-
(Continued)

gence angle to a target object (e.g., road surface) that is present in the given distance range and a second convergence angle to the virtual image displayed in the display area is at most one degree.

20 Claims, 28 Drawing Sheets

(51) Int. Cl.
*B60K 35/00* (2006.01)
*B60R 11/02* (2006.01)

(52) U.S. Cl.
CPC ...... *B60K 2370/1529* (2019.05); *B60K 2370/178* (2019.05); *B60K 2370/179* (2019.05); *B60R 2300/205* (2013.01); *B60R 2300/308* (2013.01); *B60R 2300/8086* (2013.01); *B60R 2300/8093* (2013.01); *G02B 2027/014* (2013.01); *G02B 2027/0141* (2013.01)

(56) References Cited

U.S. PATENT DOCUMENTS

| | | | |
|---|---|---|---|
| 7,616,364 B2 | 11/2009 | Saisho et al. |
| 7,663,657 B2 | 2/2010 | Ichii et al. |
| 7,672,032 B2 | 3/2010 | Hayashi et al. |
| 7,688,491 B2 | 3/2010 | Saisho et al. |
| 7,817,177 B2 | 10/2010 | Hayashi et al. |
| 7,876,486 B2 | 1/2011 | Saisho et al. |
| 7,952,808 B2 | 5/2011 | Hotta et al. |
| 7,973,990 B2 | 7/2011 | Sakai et al. |
| 8,045,248 B2 | 10/2011 | Watanabe et al. |
| 8,059,149 B2 | 11/2011 | Saisho et al. |
| 8,077,369 B2 | 12/2011 | Sakai et al. |
| 8,190,062 B2 | 5/2012 | Maruyama et al. |
| 8,213,067 B2 | 7/2012 | Saisho |
| 8,368,736 B2 | 2/2013 | Saisho et al. |
| 8,384,953 B2 | 2/2013 | Yamaguchi |
| 8,531,766 B2 | 9/2013 | Tokita et al. |
| 8,559,053 B2 | 10/2013 | Saisho et al. |
| 8,848,013 B2 | 9/2014 | Saisho et al. |
| 8,876,294 B2 | 11/2014 | Saisho et al. |
| 8,884,975 B2 | 11/2014 | Satoh et al. |
| 9,041,944 B2 | 5/2015 | Umezawa et al. |
| 9,158,124 B2 | 10/2015 | Saisho et al. |
| RE45,918 E | 3/2016 | Saisho K et al. |
| 9,514,718 B2 | 12/2016 | Itoh et al. |
| 9,544,453 B2 | 1/2017 | Umezawa et al. |
| 9,637,118 B2 | 5/2017 | Yokota et al. |
| 9,746,669 B2 | 8/2017 | Saisho et al. |
| 9,798,140 B2 | 10/2017 | Inamoto et al. |
| 9,921,460 B2 | 3/2018 | Yamaguchi et al. |
| 10,029,700 B2 * | 7/2018 | Roth ...................... G08G 1/00 |
| 10,031,343 B2 | 7/2018 | Saisho et al. |
| 2008/0204663 A1 | 8/2008 | Balogh |
| 2009/0278765 A1 | 11/2009 | Stringfellow |
| 2010/0289632 A1 * | 11/2010 | Seder ................. G06K 9/00805 340/436 |
| 2013/0163019 A1 | 6/2013 | Tago et al. |
| 2014/0036374 A1 | 2/2014 | Lescure et al. |
| 2015/0062345 A1 | 3/2015 | Kusanagi |
| 2015/0070389 A1 | 3/2015 | Goto et al. |
| 2015/0109429 A1 | 4/2015 | Inoue et al. |
| 2015/0192992 A1 | 7/2015 | Di Censo et al. |
| 2015/0331487 A1 | 11/2015 | Roth et al. |
| 2015/0332103 A1 | 11/2015 | Yokota et al. |
| 2015/0370318 A1 | 12/2015 | Yamaguchi et al. |
| 2016/0161833 A1 | 6/2016 | Watanabe et al. |
| 2016/0167514 A1 | 6/2016 | Nishizaki et al. |
| 2016/0170487 A1 | 6/2016 | Saisho |
| 2016/0284129 A1 | 9/2016 | Nishizawa et al. |
| 2016/0313562 A1 | 10/2016 | Saisho et al. |
| 2016/0320624 A1 | 11/2016 | Yamaoka |
| 2018/0096536 A1 | 4/2018 | Goto et al. |
| 2019/0005727 A1 * | 1/2019 | Tanaka ................ G06K 9/00798 |
| 2019/0187790 A1 * | 6/2019 | Woo ....................... G02B 27/00 |

FOREIGN PATENT DOCUMENTS

| | | |
|---|---|---|
| JP | 2005-301144 | 10/2005 |
| JP | 2010-076533 | 4/2010 |
| JP | 2010-120501 | 6/2010 |
| JP | 2010-173619 | 8/2010 |
| JP | 2011-090217 A | 5/2011 |
| JP | 2012-244187 | 12/2012 |
| JP | 2013-196359 | 9/2013 |
| JP | 2014-139656 | 7/2014 |
| JP | 2015-045782 | 3/2015 |
| JP | 2015-225119 | 12/2015 |
| JP | 2016-109645 A | 6/2016 |
| WO | WO 2013/069624 A1 | 5/2013 |
| WO | WO 2015/145933 A1 | 10/2015 |
| WO | WO 2017/047079 A1 | 3/2017 |

OTHER PUBLICATIONS

International Search Report dated Nov. 22, 2016 in PCT/JP2016/004167 filed on Sep. 13, 2016.
Extended European Search Report dated Sep. 18, 2018 in Patent Application No. 16845953.5.
U.S. Appl. No. 15/758,810, filed Mar. 9, 2018.
Office Action dated May 1, 2019 in co-pending U.S. Appl. No. 15/758,810, 31 pages.
Office Action dated Jun. 18, 2020, in corresponding Japanese Patent Application No. 2017-014181 (with English translation), citing document AO-AQ therein, 9 pages.
Office Action dated Jul. 27, 2020, in corresponding Chinese Patent Application No. 201780042824.7 (with English translation) citing document AA herein, 23 pages.

\* cited by examiner

[Fig. 1]
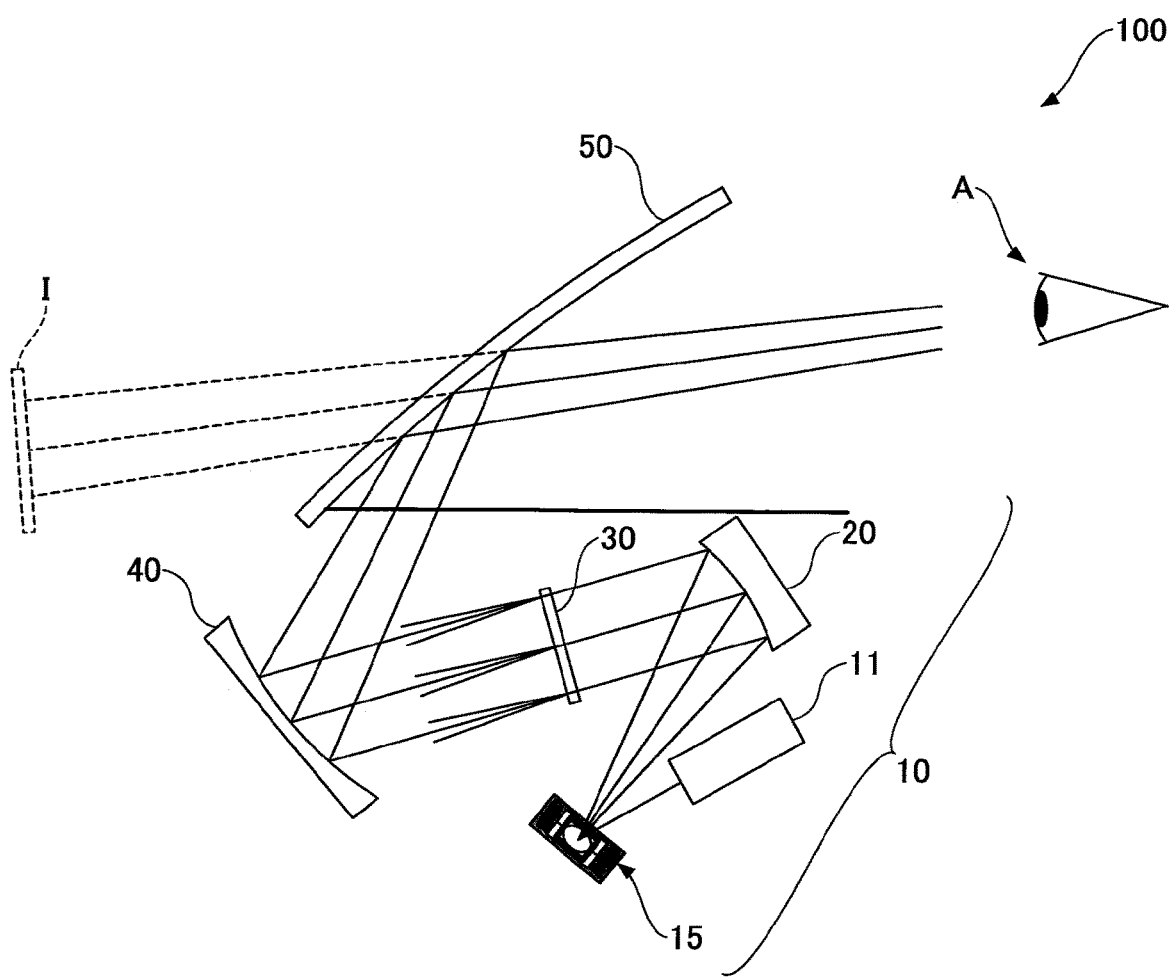

[Fig. 2]
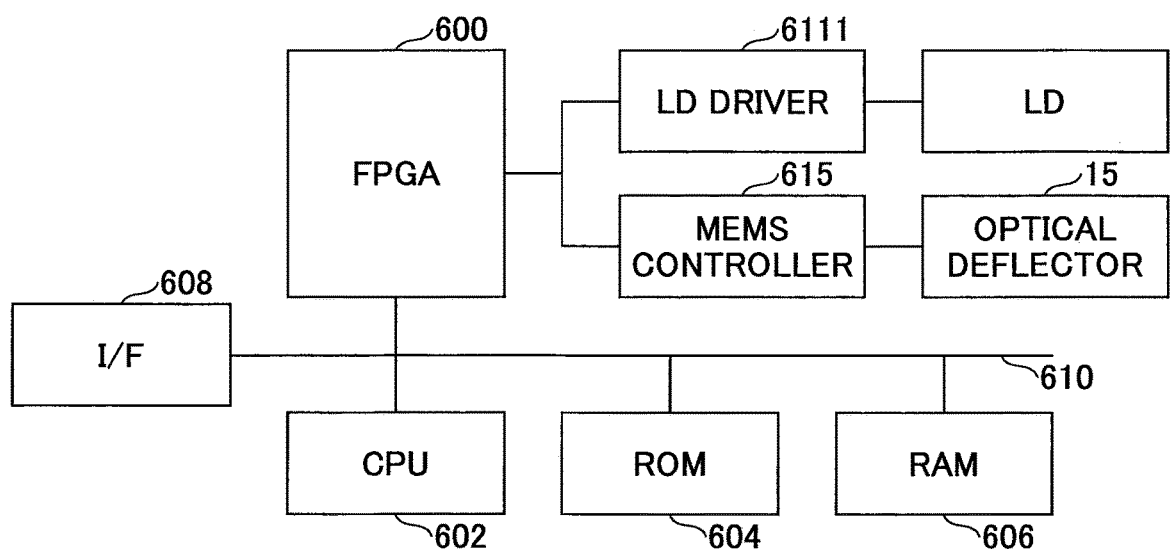
[Fig. 3]
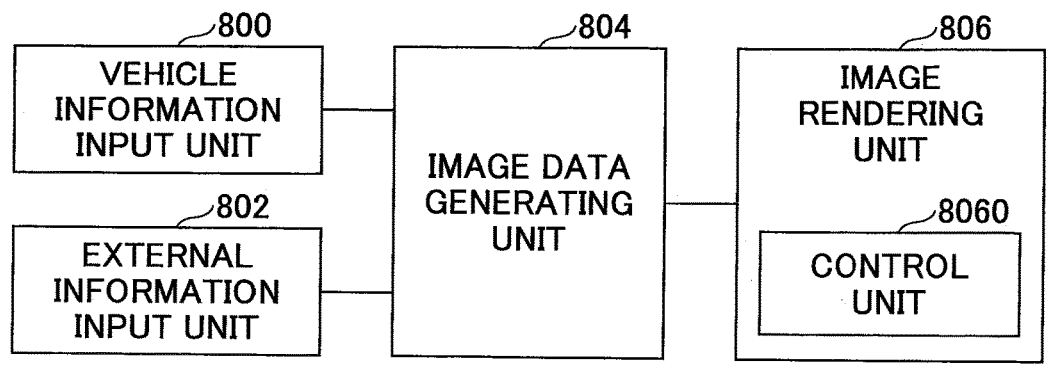

[Fig. 4]
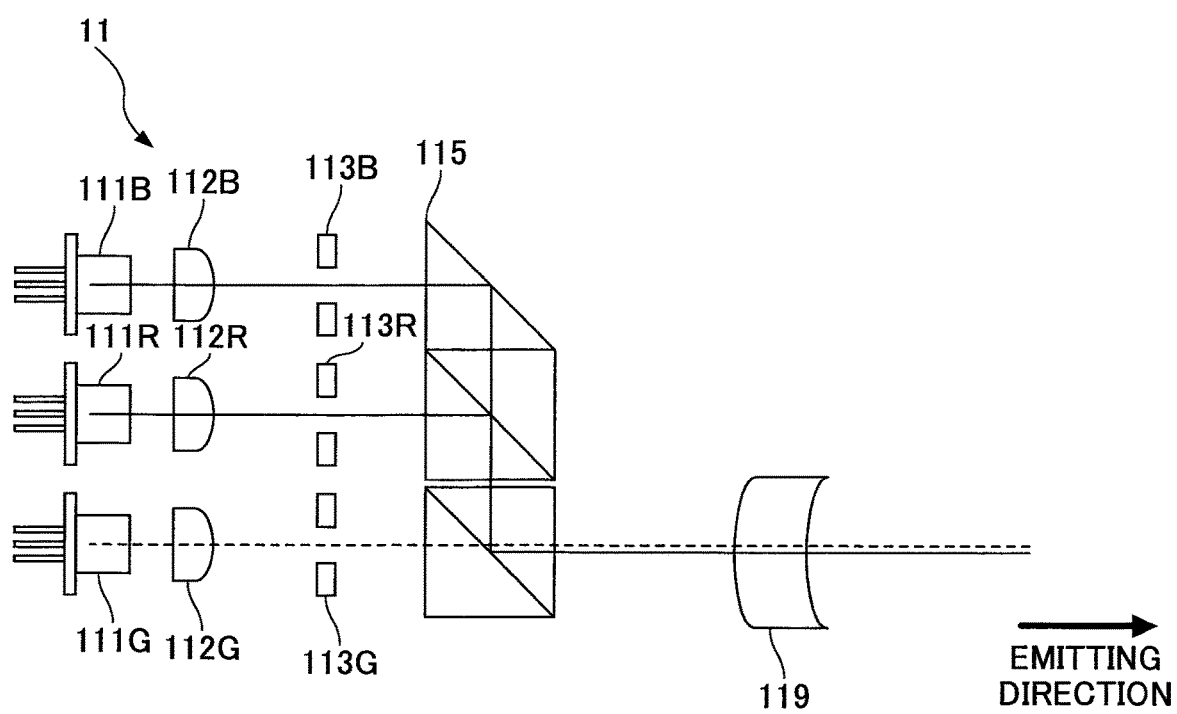

[Fig. 5]
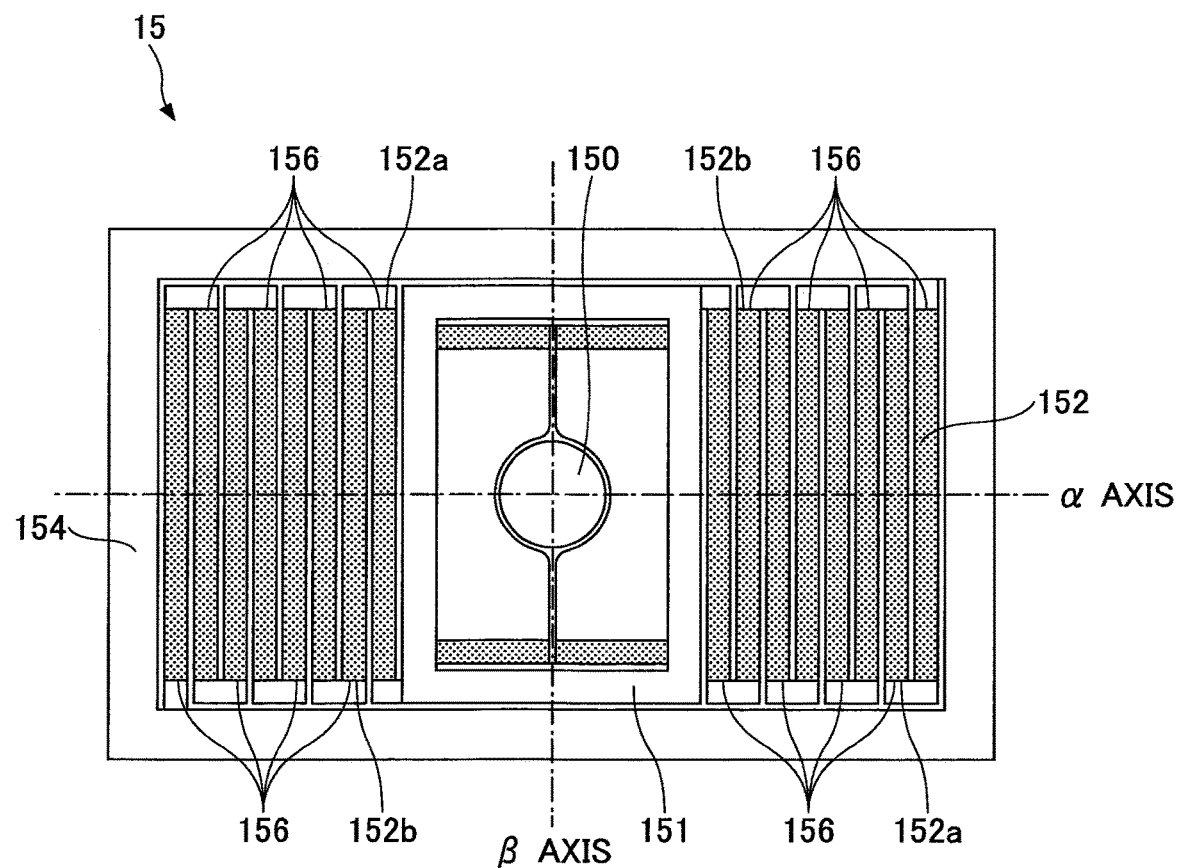

[Fig. 6]
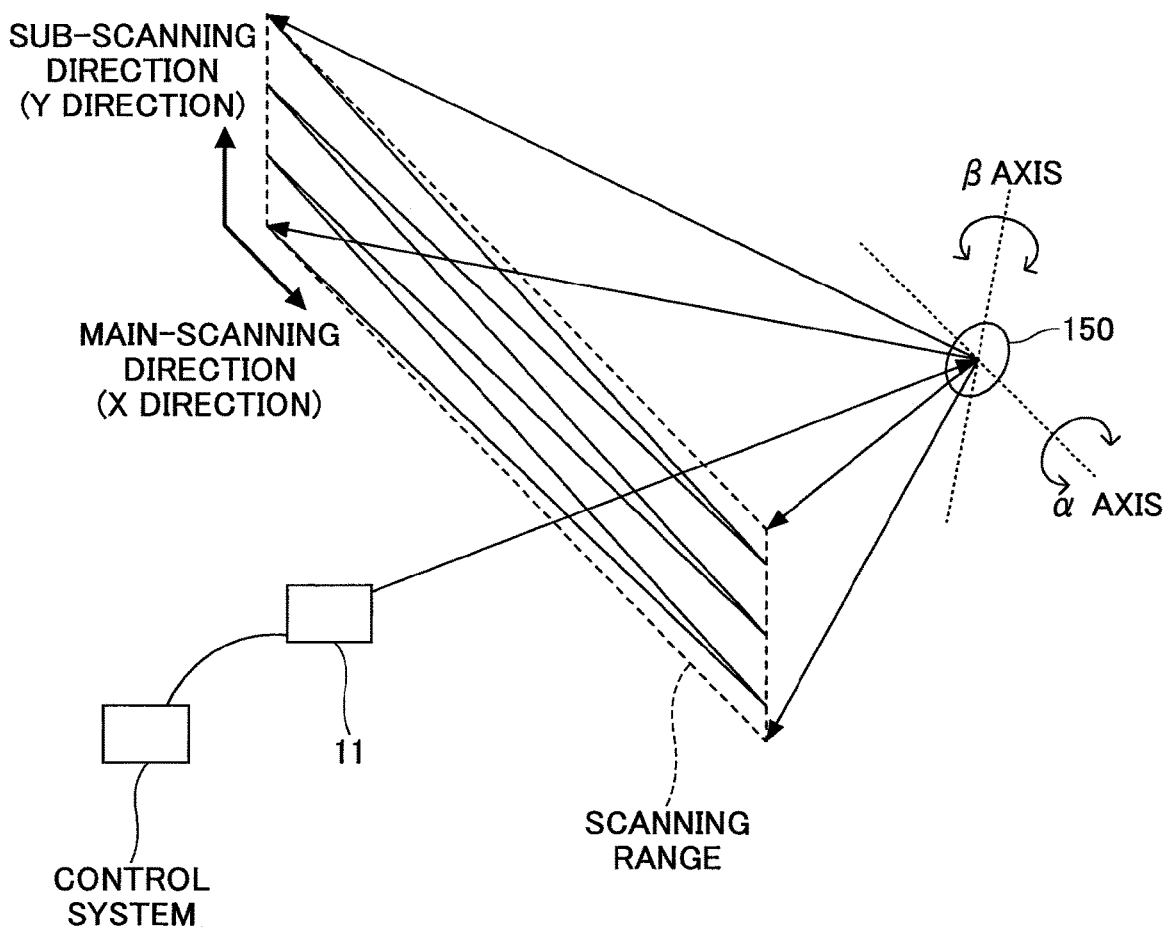

[Fig. 7]
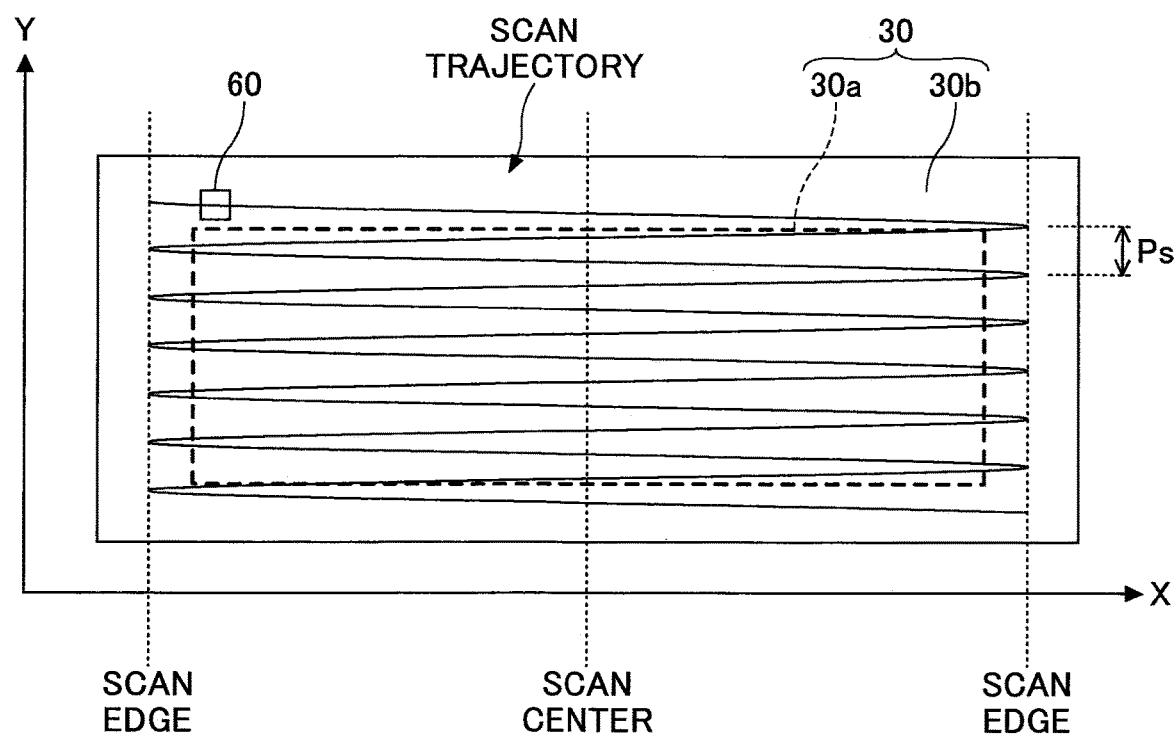

[Fig. 8A]
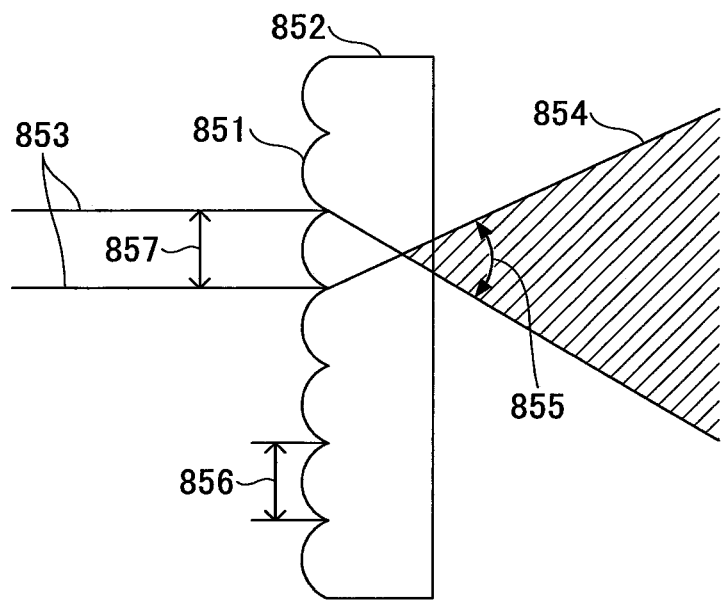
[Fig. 8B]
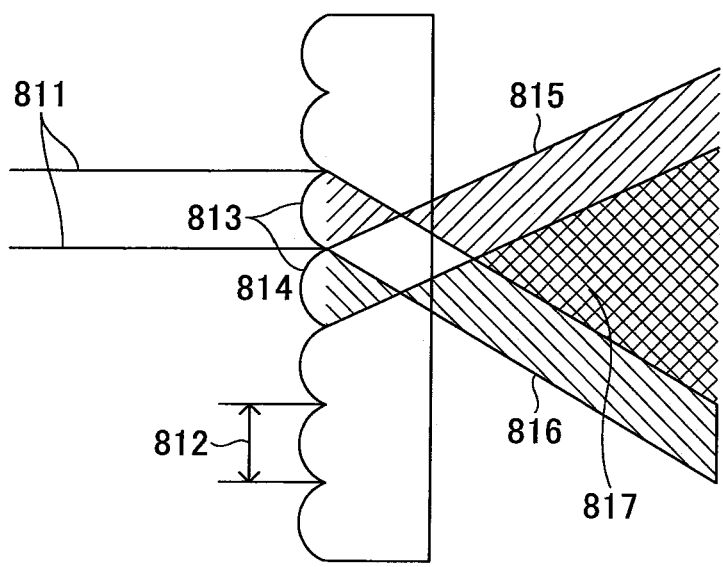

[Fig. 9]
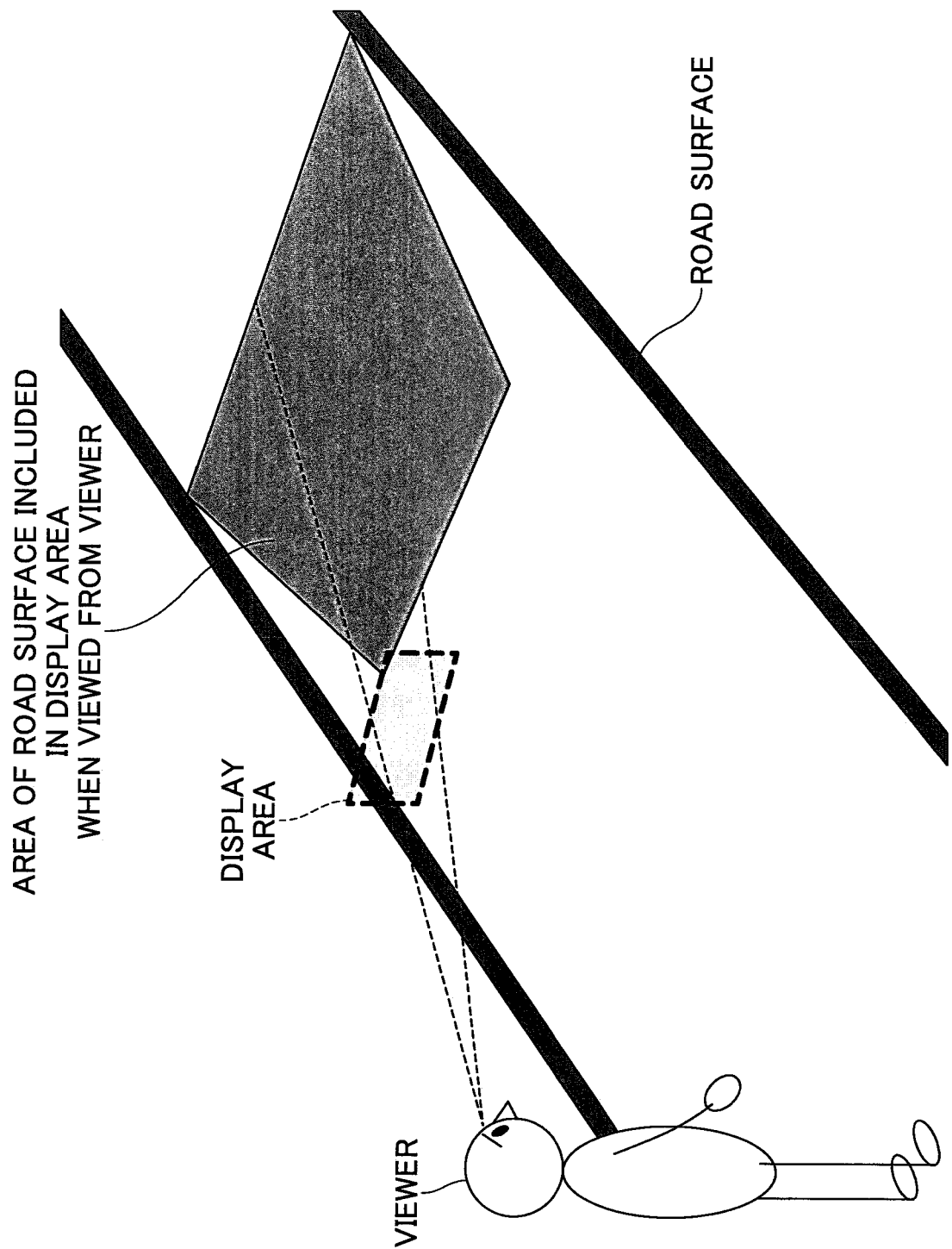

[Fig. 10]
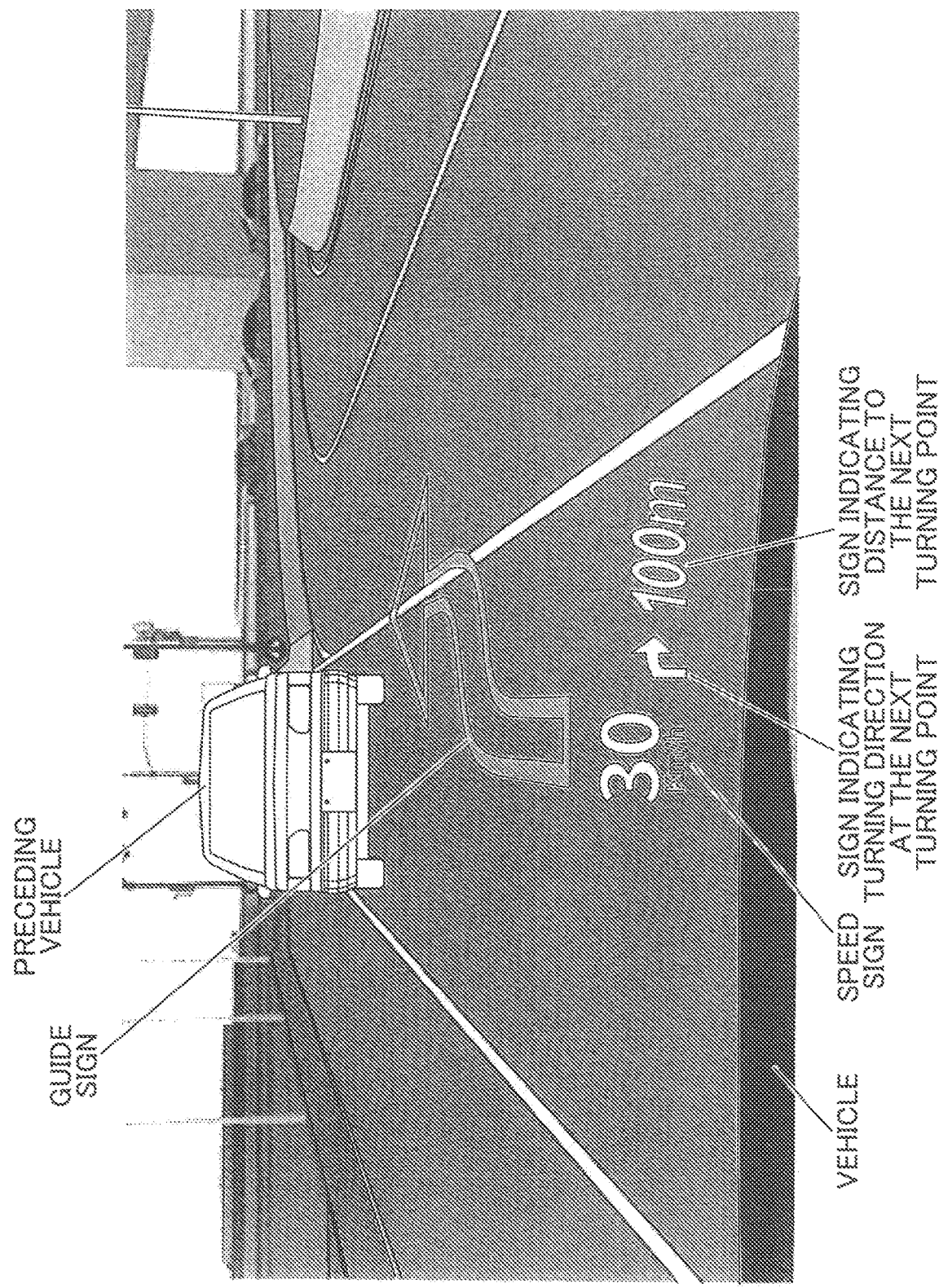

[Fig. 11]
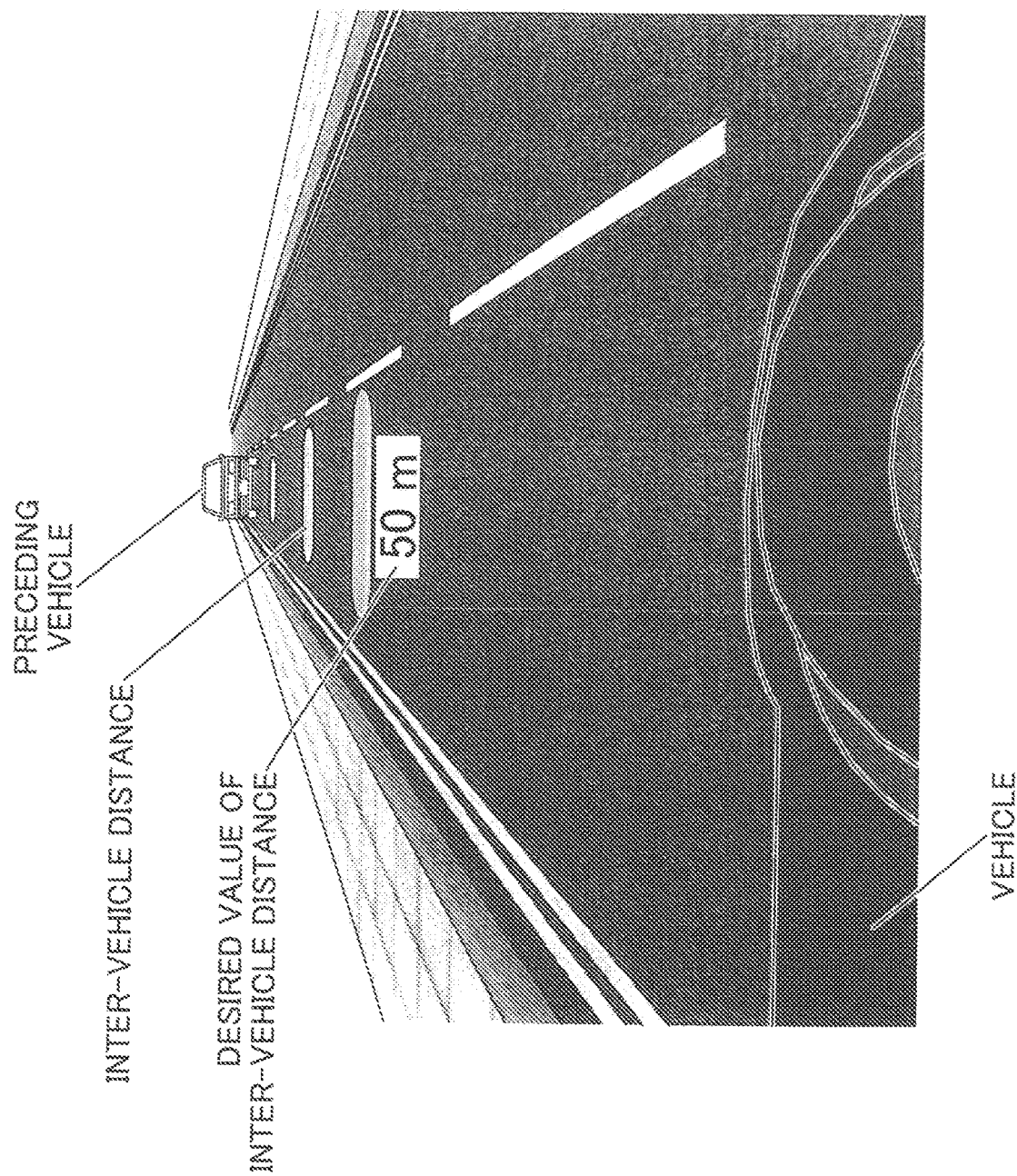

[Fig. 12]
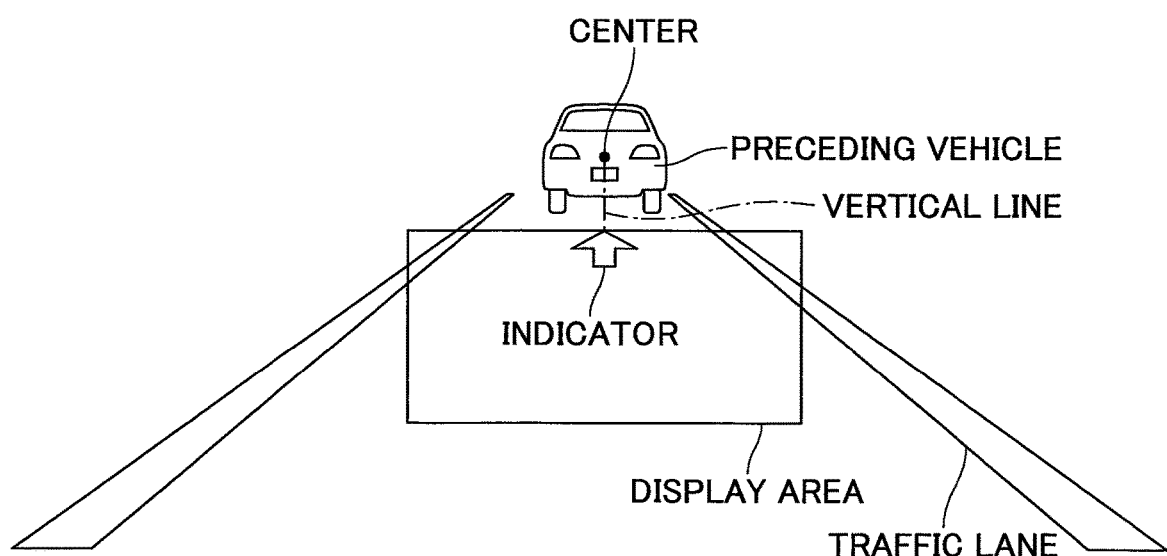

[Fig. 13]
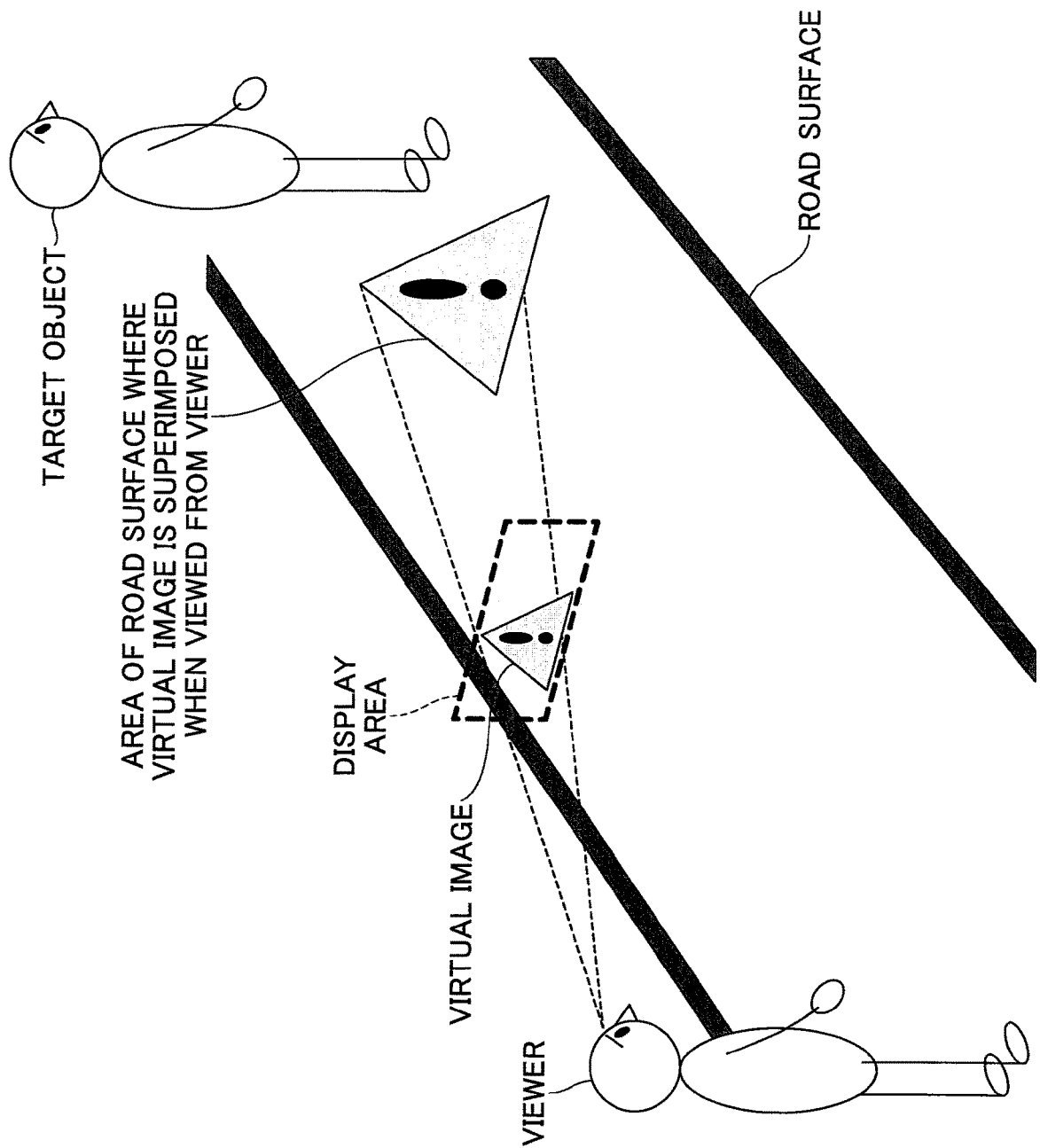

[Fig. 14]
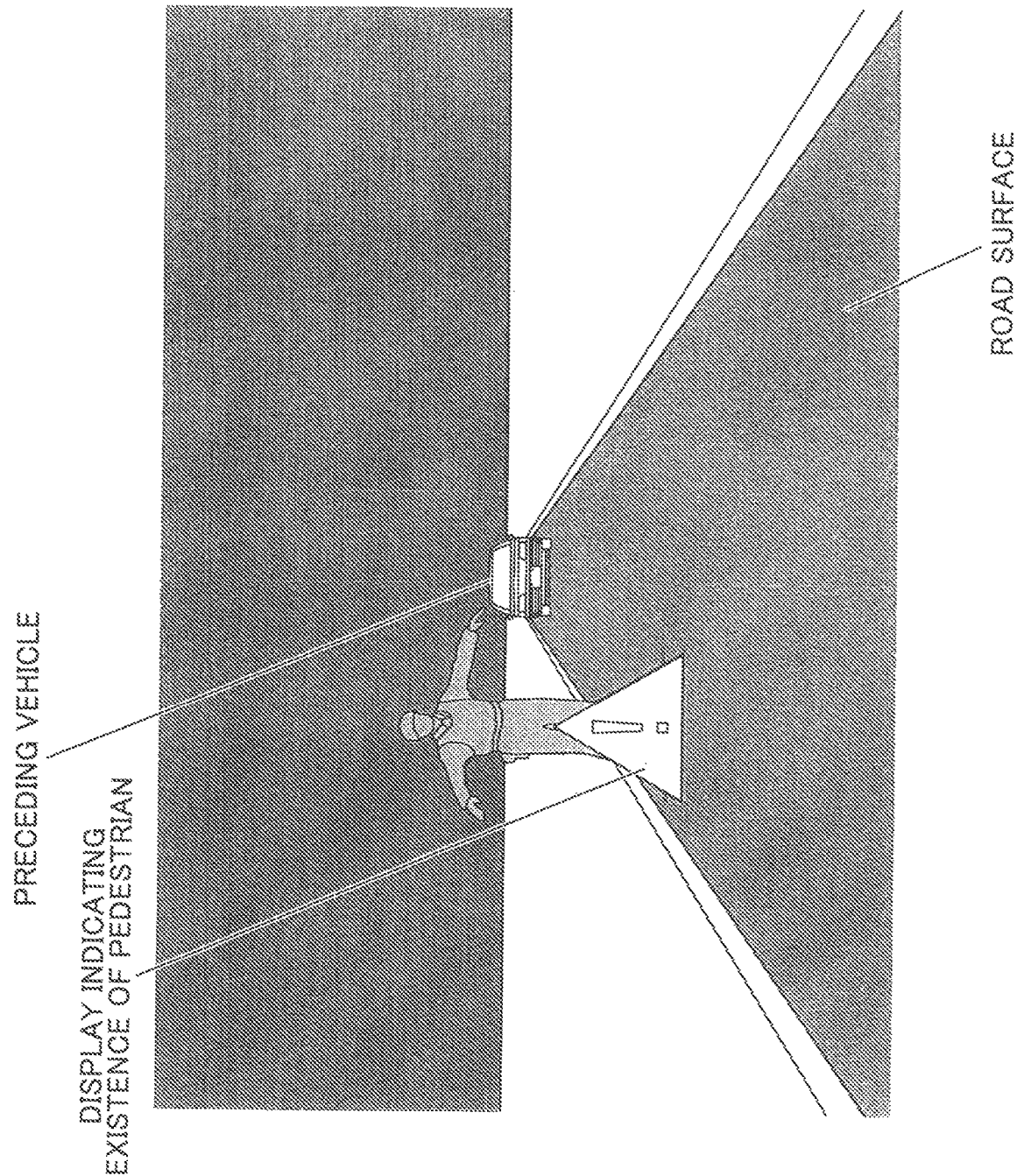

[Fig. 15]
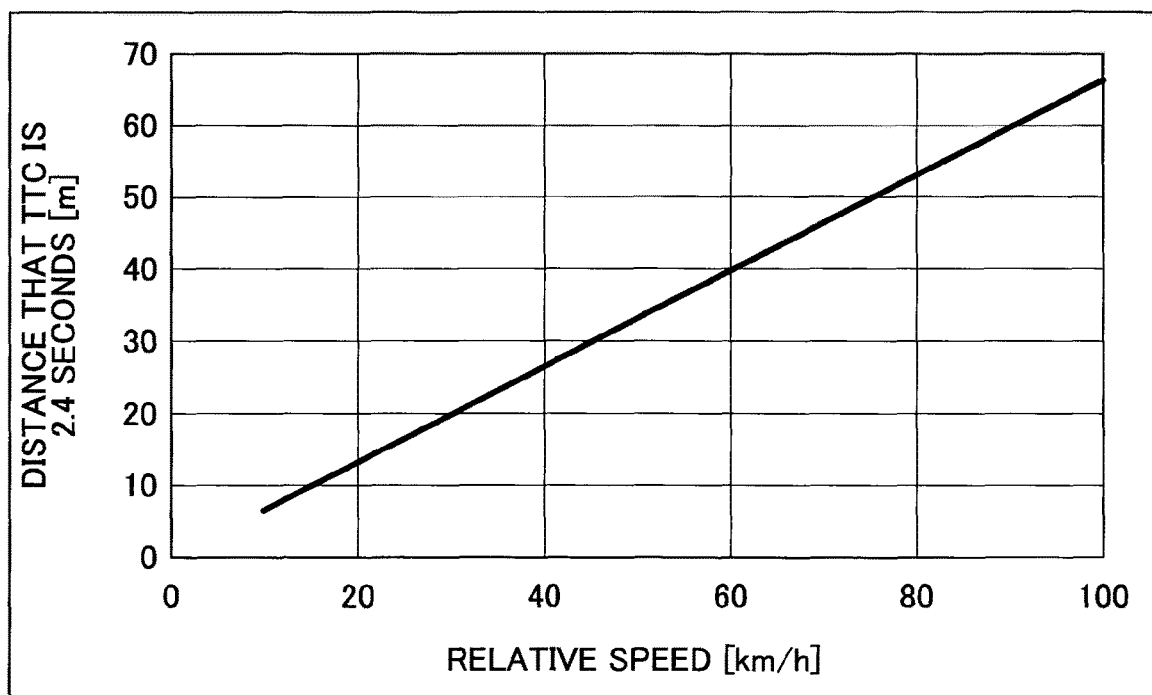

[Fig. 16]
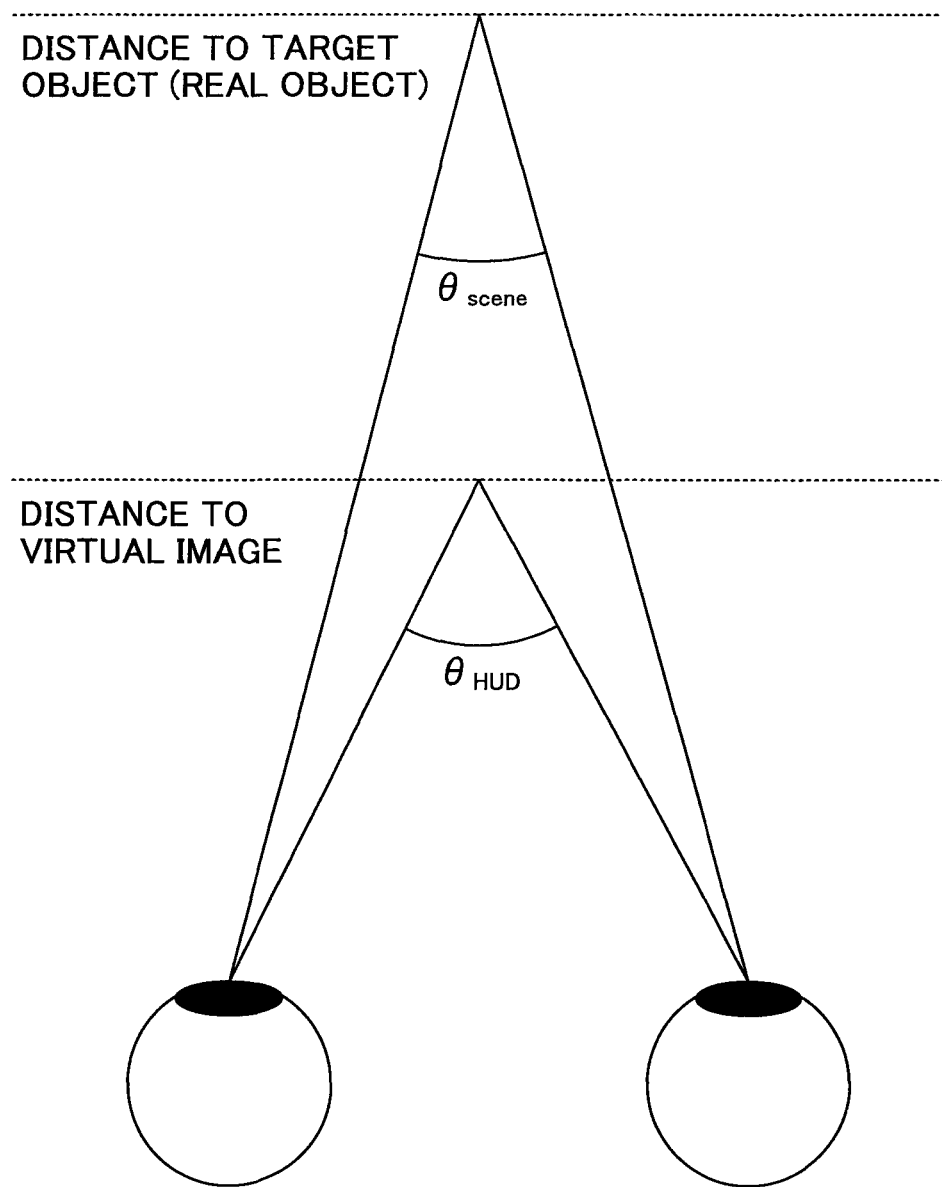

[Fig. 17]

| DISTANCE TO BACKGROUND (POINT OF FOCUS) | DISTANCE TO VIRTUAL IMAGE AND PARALLACTIC ANGLE (CONVERGENCE ANGLE DIFFERENCE) | | | | | |
|---|---|---|---|---|---|---|
| | 2 [m] | 3 [m] | 4 [m] | 6 [m] | 8 [m] | 10 [m] |
| 5 | 1.117 | 0.497 | 0.186 | 0.124 | 0.279 | 0.372 |
| 10 | 1.490 | 0.869 | 0.559 | 0.248 | 0.093 | 0.000 |
| 15 | 1.614 | 0.993 | 0.683 | 0.372 | 0.217 | 0.124 |
| 20 | 1.676 | 1.055 | 0.745 | 0.434 | 0.279 | 0.186 |
| 25 | 1.713 | 1.092 | 0.782 | 0.472 | 0.317 | 0.223 |
| 30 | 1.738 | 1.117 | 0.807 | 0.497 | 0.341 | 0.248 |
| 35 | 1.756 | 1.135 | 0.825 | 0.514 | 0.359 | 0.266 |
| 40 | 1.769 | 1.148 | 0.838 | 0.528 | 0.372 | 0.279 |
| 45 | 1.779 | 1.159 | 0.848 | 0.538 | 0.383 | 0.290 |
| 50 | 1.787 | 1.167 | 0.857 | 0.546 | 0.391 | 0.298 |
| 55 | 1.794 | 1.174 | 0.863 | 0.553 | 0.398 | 0.305 |
| 60 | 1.800 | 1.179 | 0.869 | 0.559 | 0.403 | 0.310 |
| 65 | 1.805 | 1.184 | 0.874 | 0.563 | 0.408 | 0.315 |
| 70 | 1.809 | 1.188 | 0.878 | 0.567 | 0.412 | 0.319 |
| 75 | 1.812 | 1.192 | 0.881 | 0.571 | 0.416 | 0.323 |
| 80 | 1.815 | 1.195 | 0.884 | 0.574 | 0.419 | 0.326 |
| 85 | 1.818 | 1.198 | 0.887 | 0.577 | 0.422 | 0.329 |
| 90 | 1.821 | 1.200 | 0.890 | 0.579 | 0.424 | 0.331 |
| 95 | 1.823 | 1.202 | 0.892 | 0.581 | 0.426 | 0.333 |
| 100 | 1.825 | 1.204 | 0.894 | 0.583 | 0.428 | 0.335 |
| 1000 | 1.858 | 1.238 | 0.927 | 0.617 | 0.462 | 0.369 |

[Fig. 18]
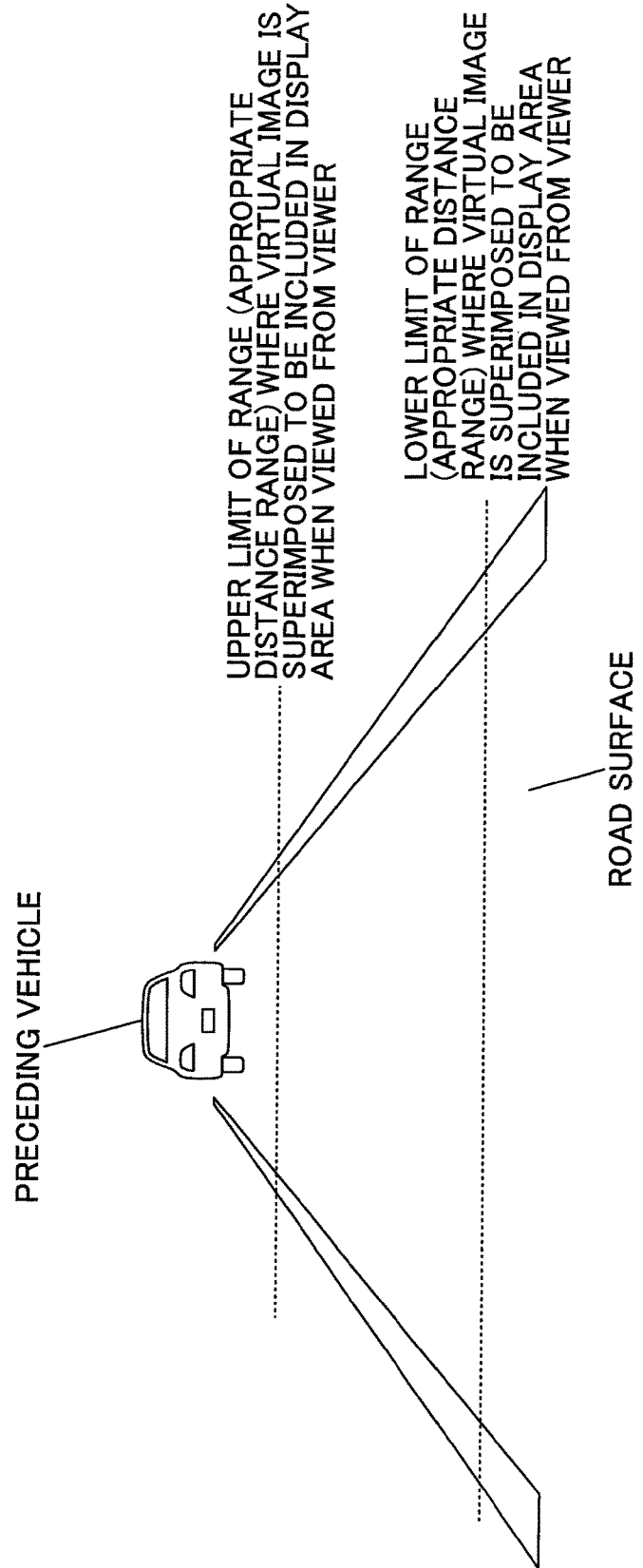

[Fig. 19]
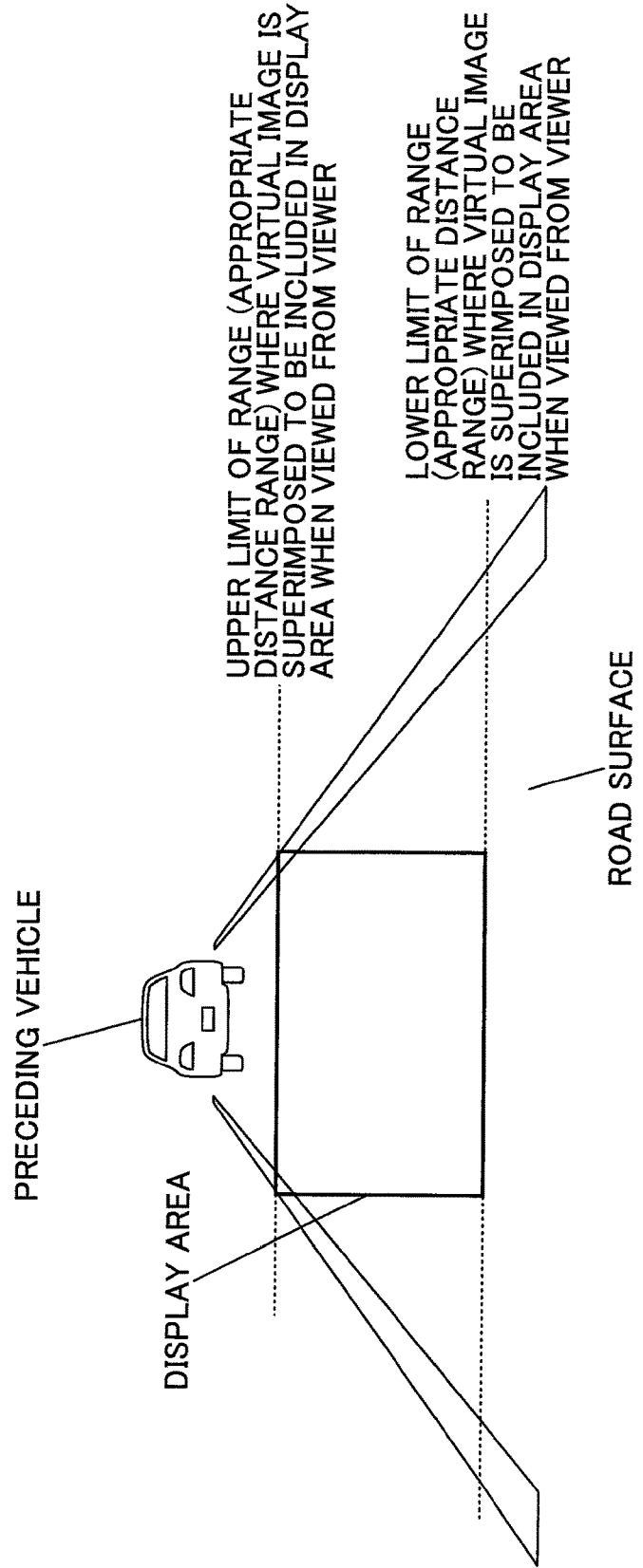

[Fig. 20]
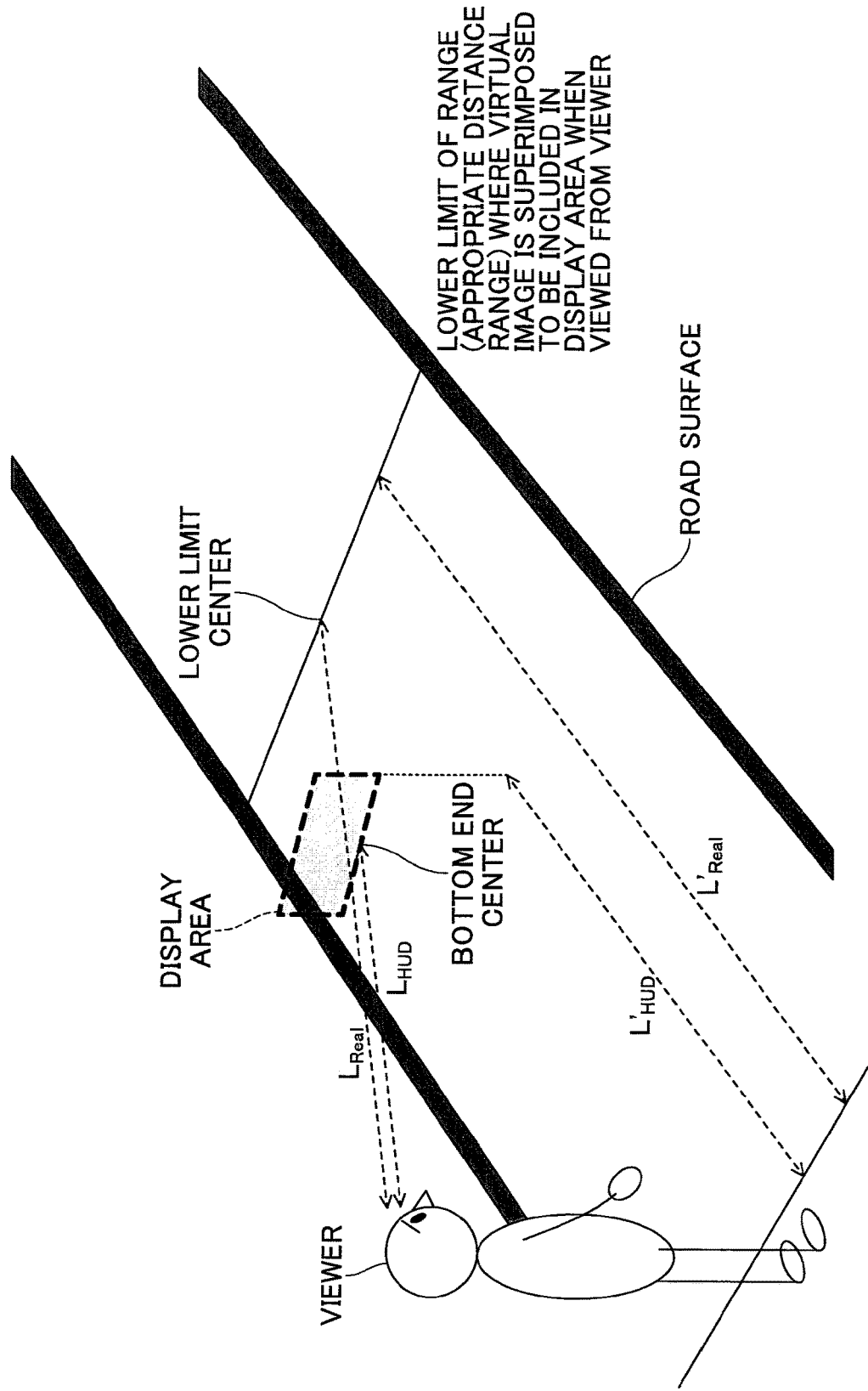

[Fig. 21]
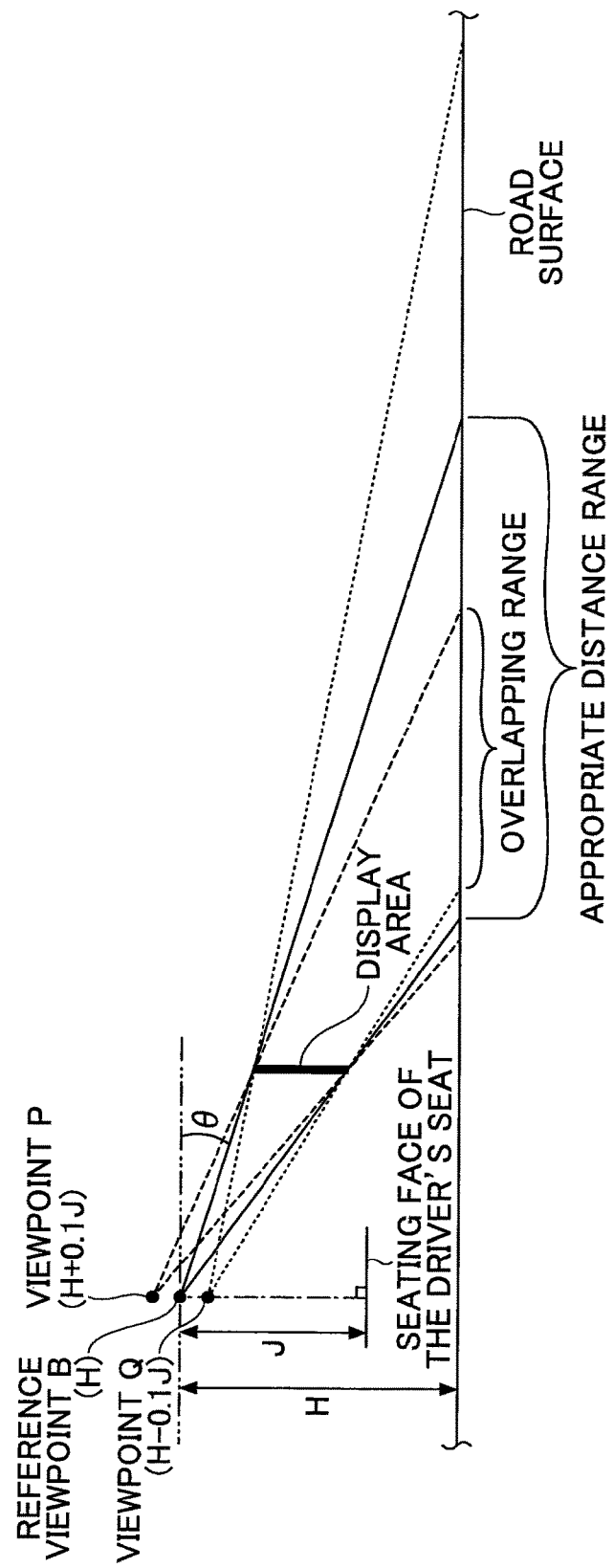

[Fig. 22]
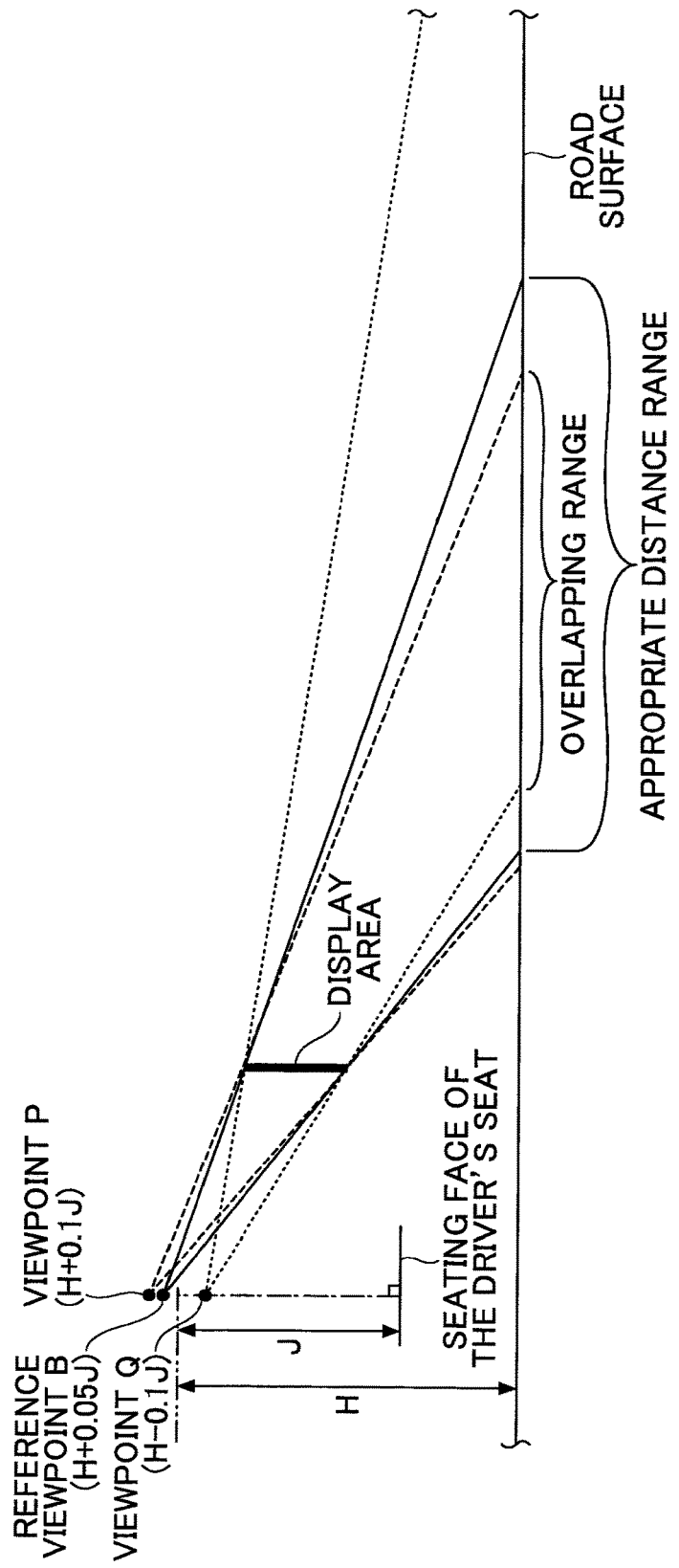

[Fig. 23]
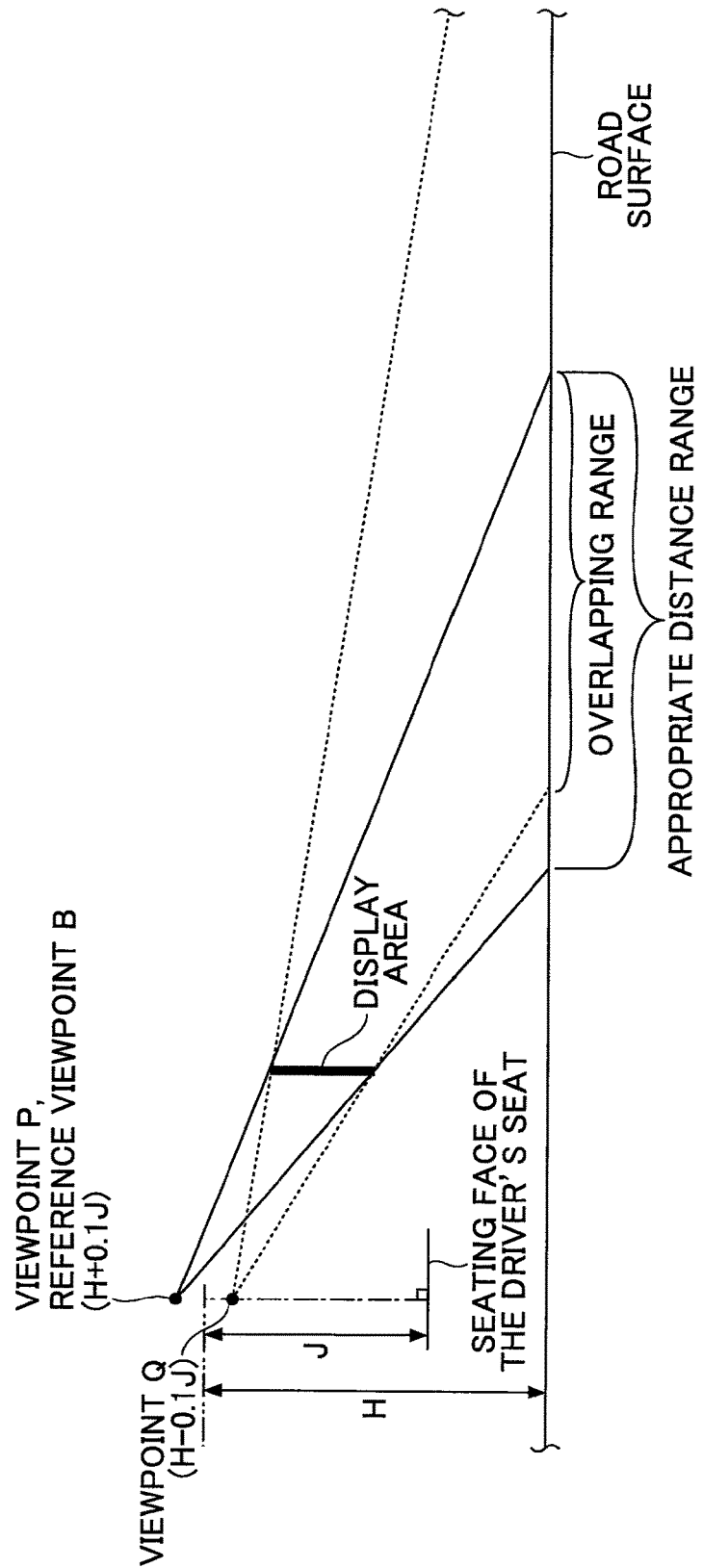

[Fig. 24]
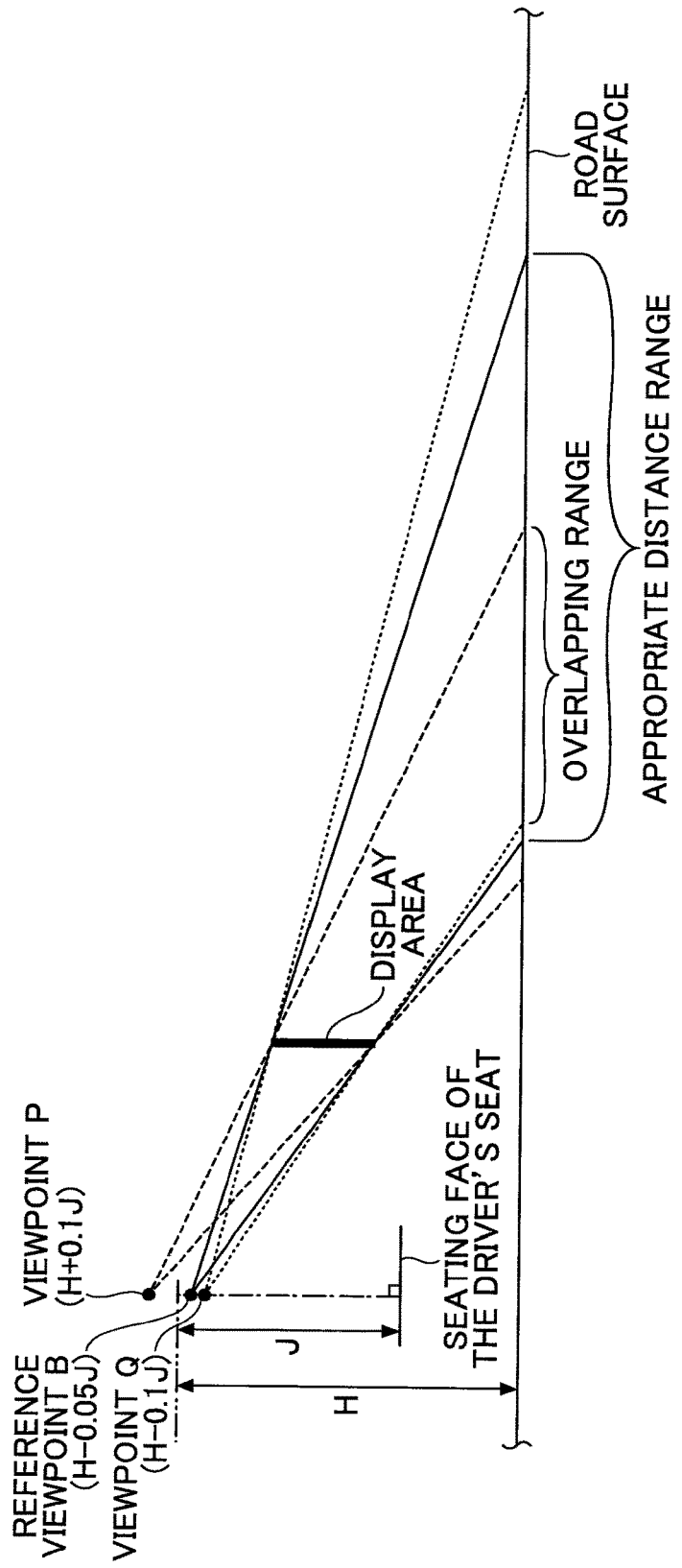

[Fig. 25]
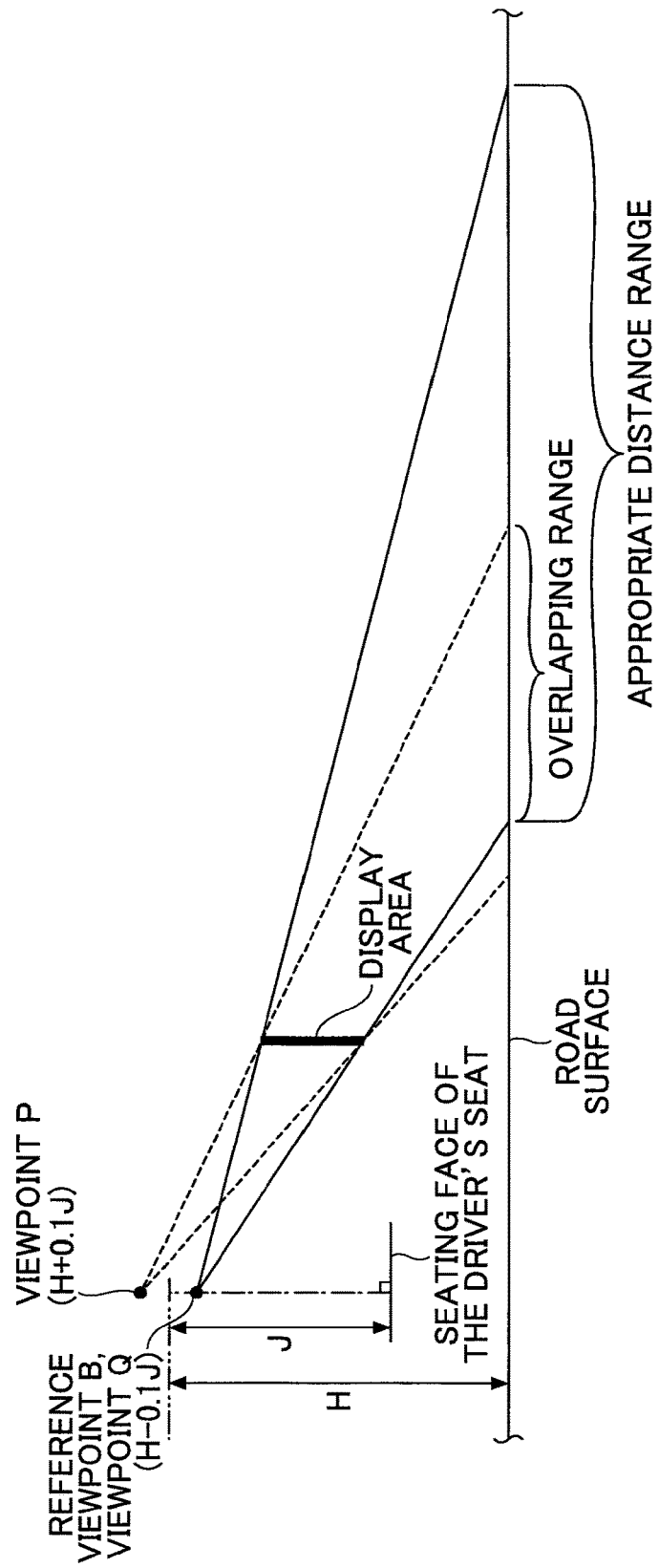

[Fig. 26]
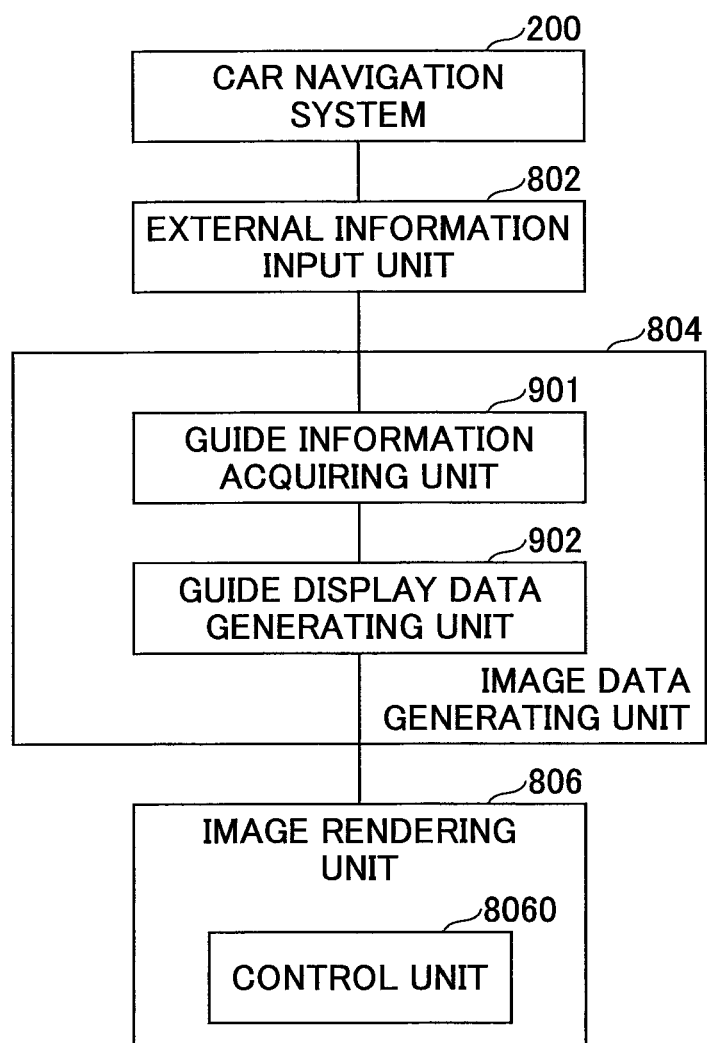

[Fig. 27]
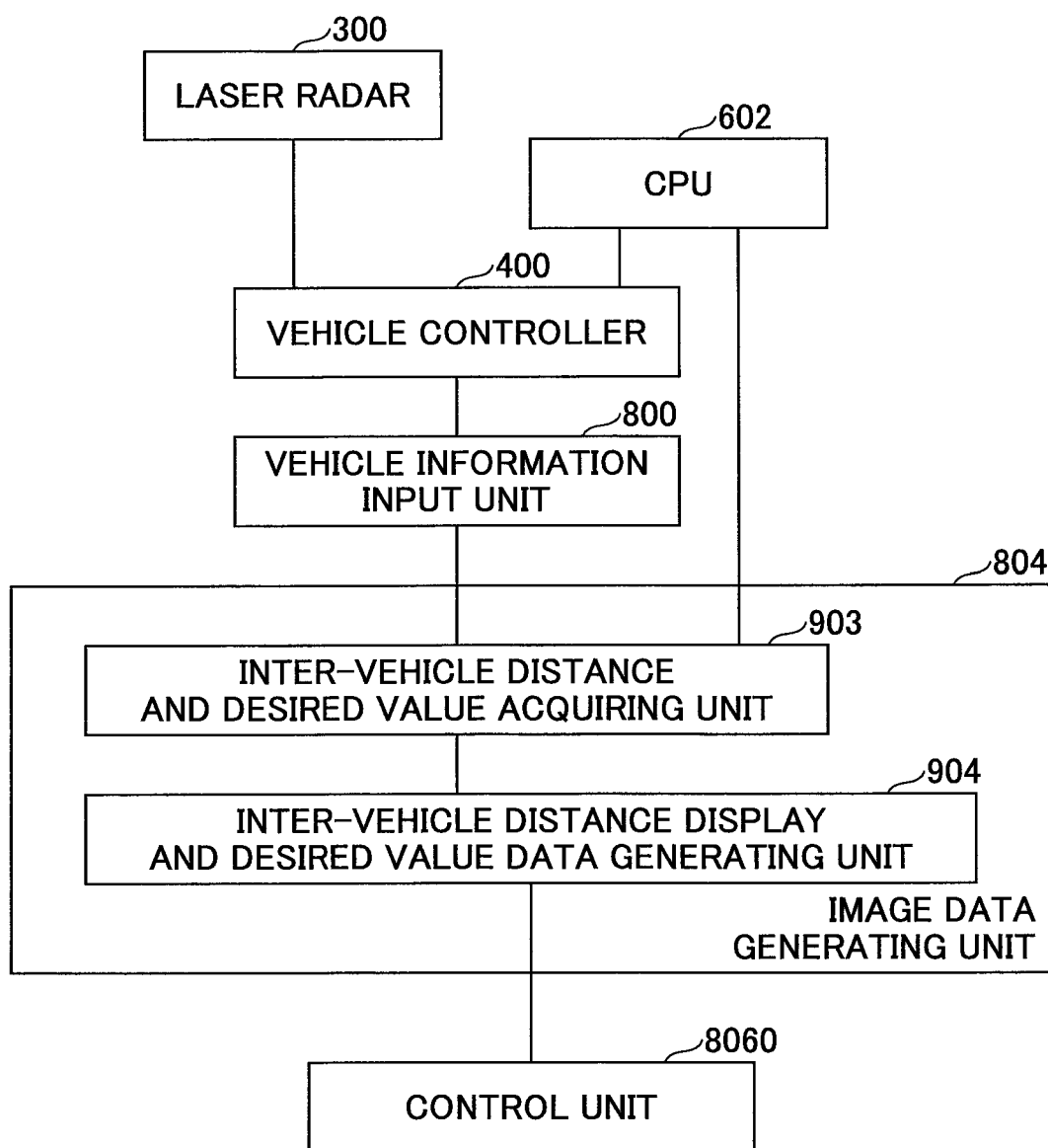

[Fig. 28]
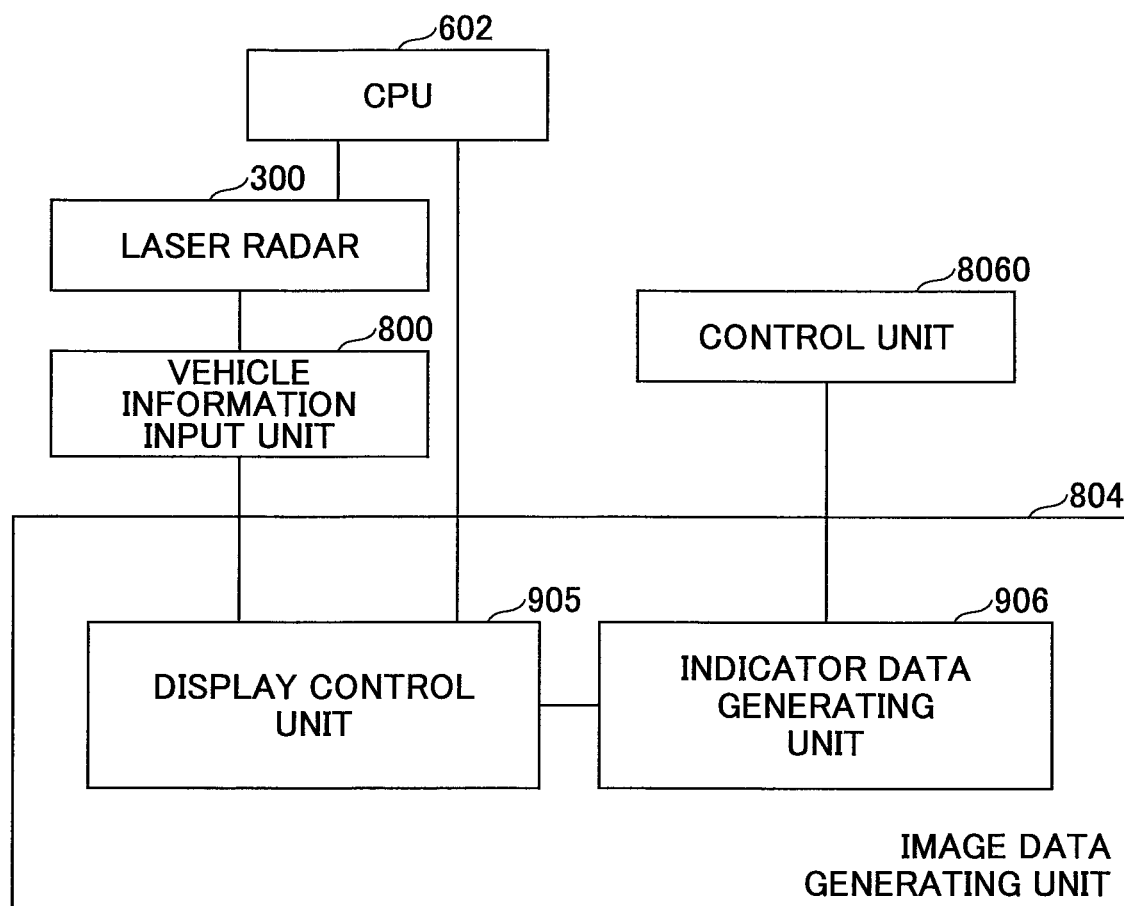

[Fig. 29]
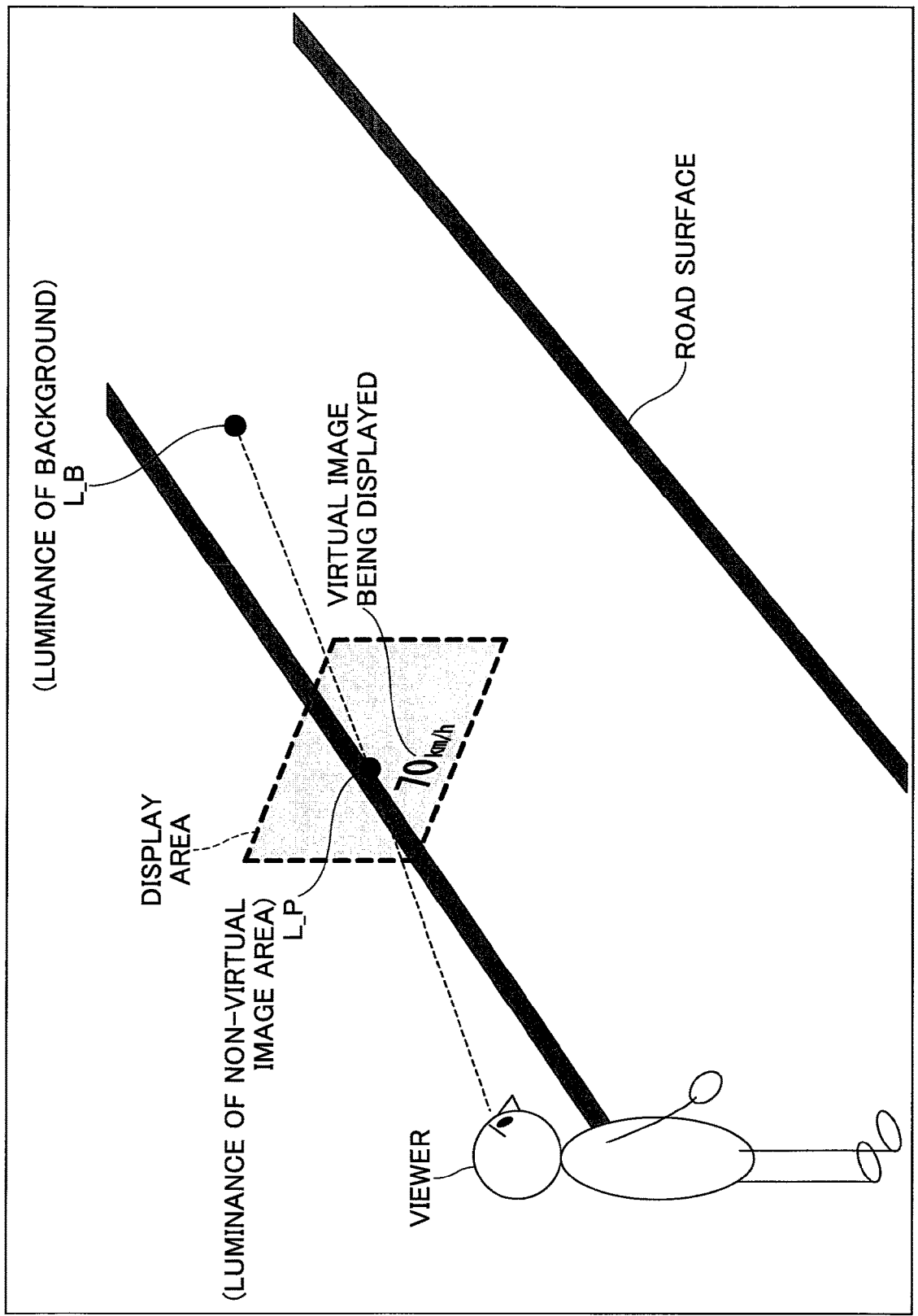

DISPLAY APPARATUS, MOVABLE BODY APPARATUS, PRODUCING METHOD OF THE DISPLAY APPARATUS, AND DISPLAY METHOD

TECHNICAL FIELD

The present invention relates to a display apparatus, a movable body apparatus, a producing method of the display apparatus, and a display method.

BACKGROUND ART

An apparatus that displays a virtual image in a display area to overlap the virtual image on scenery outside a movable body has been known as a related art (e.g., see PTL 1).

CITATION LIST

Patent Literature

[PTL 1] Japanese Unexamined Patent Application Publication No. 2013-196359

SUMMARY OF INVENTION

Technical Problem

Regarding the apparatus disclosed in PTL 1, however, there is scope for improvement in simultaneous visibility of a target object present in the scenery outside the movable body and the virtual image.

Solution to Problem

In one embodiment, a display apparatus is configured to irradiate light for forming an image on a transmissive reflector provided in a movable body, and to display a virtual image in a display area to overlap the virtual image with scenery outside the movable body. A given distance range to the scenery from a reference point that is set in the movable body is included in the display area, and a difference between a first convergence angle to a target object (e.g., road surface) present in the given distance range and a second convergence angle to the virtual image displayed in the display area is at most one degree.

Advantageous Effects of Invention

In one or more embodiments, the simultaneous visibility of the target object and the virtual image can be improved.

BRIEF DESCRIPTION OF DRAWINGS

FIG. 1 is a diagram of a general arrangement of an HUD apparatus in one embodiment.

FIG. 2 is a block diagram of a hardware configuration of a control system of the HUD apparatus.

FIG. 3 is a block diagram of a functional configuration of the HUD apparatus.

FIG. 4 illustrates a configuration of a light source unit in the HUD apparatus.

FIG. 5 illustrates a configuration of an optical deflector in the HUD apparatus.

FIG. 6 illustrates a relationship between a mirror of the optical deflector and a scanning range.

FIG. 7 illustrates one example of a scan trajectory in two-dimensional scanning.

FIG. 8A illustrates a difference in effect caused by a difference in size between an incoming light flux diameter and a lens diameter in a microlens array.

FIG. 8B illustrates the difference in effect caused by the difference in size between the incoming light flux diameter and the lens diameter in the microlens array.

FIG. 9 illustrates a method for displaying the virtual image as if the virtual image sticks to a road surface.

FIG. 10 illustrates a method for displaying the virtual image as if a guide sign sticks to a road surface.

FIG. 11 illustrates a method for displaying the virtual image as if an intervehicle distance indication sticks to a road surface.

FIG. 12 illustrates a method for displaying the virtual image as if an indicator sticks to a road surface.

FIG. 13 illustrates a first example of displaying a caution mark to be perpendicular to the road surface.

FIG. 14 illustrates a second example of displaying a caution mark to be perpendicular to the road surface.

FIG. 15 is a graph indicating a relationship between a relative speed between a vehicle and a preceding vehicle and a desired value of an inter-vehicle distance.

FIG. 16 illustrates a parallactic angle when a viewer views a target object and the virtual image simultaneously.

FIG. 17 is a table showing relationships between a distance between a viewpoint and the background and a distance between the viewpoint and the virtual image.

FIG. 18 illustrates an appropriate distance range of the road surface on which the virtual image is superimposed for display.

FIG. 19 illustrates a first method for setting a position of a display area.

FIG. 20 illustrates a second method for setting the position of the display area.

FIG. 21 illustrates a first method for setting a reference viewpoint.

FIG. 22 illustrates a second method for setting the reference viewpoint.

FIG. 23 illustrates a third method for setting the reference viewpoint.

FIG. 24 illustrates a fourth method for setting the reference viewpoint.

FIG. 25 illustrates a fifth method for setting the reference viewpoint.

FIG. 26 is a block diagram of a configuration example of the HUD apparatus configured to display the guide sign.

FIG. 27 is a block diagram of a configuration example of the HUD apparatus configured to display the inter-vehicle distance.

FIG. 28 is a block diagram of a configuration example of the HUD apparatus configured to display the indicator.

FIG. 29 illustrates a relationship between L_B (luminance of background) and L_P (luminance of non-virtual image area).

DESCRIPTION OF EMBODIMENTS

<Outline Configuration>

Hereinafter, an HUD apparatus 100 in one embodiment will be described with reference to the drawings. Note that "HUD" is an abbreviation of "Heads-Up Display".

FIG. 1 schematically illustrates a general arrangement of the HUD apparatus 100 in one embodiment.

<General Arrangement of HUD Apparatus>

Projection methods of the HUD apparatuses are usually classified into "panel methods" and "laser scanning methods". In the panel methods, an intermediate image is formed by using an imaging device, such as a liquid crystal panel, a digital mirror device (DMD) panel, or a vacuum fluorescent display (VFD). In the laser scanning methods, the intermediate image is formed by scanning a laser beam emitted from a laser light source using a two-dimensional scanning device. Especially, in the laser scanning methods, emission and non-emission can be assigned for each of pixels and thus high contrast images can be formed, unlike in the panel methods in which images are formed by partially shading full-screen emission.

Therefore, as the projection method, the "laser scanning method" is applied for the HUD apparatus 100, but the "panel method" can also be applied.

The HUD apparatus 100 is mounted on, for example, a vehicle and is configured to make navigation information for operation of the vehicle visible through a front windshield 50 (see FIG. 1) of the vehicle. The navigation information includes, for example, a vehicle speed, course information, a distance to a destination, a present location name, a presence or absence of an object (i.e., target object) ahead of the vehicle and a location of the object, an indicator such as a limiting speed, congestion information, etc. In such a case, the front windshield 50 also functions as a transmissive reflector that permits part of the incoming light to transmit and reflects at least part of the remaining light. In the following, an example where the HUD apparatus 100 is installed in an automobile that is a vehicle including the front windshield 50 will be described specifically.

As illustrated in FIG. 1, the HUD apparatus 100 includes an optical scanning unit 10, a screen 30, and a concave mirror 40. The optical scanning unit 10 includes a light source unit 11, an optical deflector 15, and a scanning mirror 20. By emitting to the front windshield 50 light beams (i.e., image light beams) for forming an image on the front windshield 50, the HUD apparatus 100 makes a virtual image I visible from a viewpoint position of a viewer A (i.e., a driver who is an occupant of the vehicle, herein). That is to say, the viewer A is able to view an image (i.e., intermediate image) on the screen 30 formed (or rendered) by the optical scanning unit 10, as the virtual image I on the front windshield 50.

As an example, the HUD apparatus 100 is disposed under the dashboard of the vehicle. A distance between the viewpoint position of the viewer A and the front windshield 50 ranges from several tens of centimeters to one meter at most.

In the present embodiment, the concave mirror 40 is designed using existing optical design simulation software to gain a constant light-focusing power so that the virtual image I can be formed at a desired position.

In the HUD apparatus 100, the light-focusing power of the concave mirror 40 is set so that the virtual image I can be displayed at a position (depth position) having a distance of larger than or equal to one meter and smaller than or equal to 30 meters from the viewpoint position of the viewer A, in one embodiment. The distance may be larger than or equal to one meter and smaller than or equal to 10 meters, in another embodiment.

Note that the front windshield is usually formed into not a flat surface but a slightly curved surface. For this reason, the imaging position of the virtual image I is determined by the curved surfaces of the concave mirror 40 and the front windshield 50.

In the light source unit 11, laser beams of three colors of R, G, and B that have been modulated in accordance with image data are combined. The combined light beam, in which the laser beams of three colors are combined, is led to a reflection surface of the optical deflector 15. The optical deflector 15 serving as a deflector may be a Micro Electro Mechanical Systems (MEMS) scanner produced by a semiconductor manufacturing process, for example. The MEMS scanner includes a single micro mirror which can oscillate independently around two orthogonal axes. Details of the light source unit 11 and the optical deflector 15 will be described later.

The light beams (i.e., combined light beam) emitted from the light source unit 11 in accordance with the image data is deflected by the optical deflector 15, is reflected back by the scanning mirror 20, and is emitted onto the screen 30. On the screen 30, the light is scanned and the intermediate image is formed. To be specific, a light-scanning system includes the optical deflector 15 and the scanning mirror 20. Note that the concave mirror 40 may be designed and arranged to correct an optical distortion element that forms a horizontal line of the intermediate image in a convex shape curving upward or downward due to an influence of the front windshield 50.

The laser beams that have passed through the screen 30 are reflected by the concave mirror 40 toward the front windshield 50. Part of the incoming light flux to the front windshield 50 passes through the front windshield 50, and at least part of the remaining light flux is reflected toward the viewpoint position of the viewer A. Consequently, the viewer A is able to view the virtual image I, which is created by enlarging the intermediate image, on the front windshield 50. In other words, the virtual image I is enlarged and displayed through the front windshield 50, when the display area is viewed from the viewer A.

Note that a combiner serving as the transmissive reflector can be disposed on the viewpoint position side of the viewer A of the front windshield 50, so that the laser beams from the concave mirror 40 can be emitted onto the combiner. This configuration also enables the virtual image I to be displayed in a similar manner to the case where the virtual image I is displayed on the front windshield 50.

<Hardware Configuration of Control System of HUD Apparatus>

FIG. 2 is a block diagram of a hardware configuration of a control system of the HUD apparatus 100. As illustrated in FIG. 2, the control system of the HUD apparatus 100 includes a field-Programmable Gate Array (FPGA) 600, a Central Processing Unit (CPU) 602, a Read-Only Memory (ROM) 604, an Interface (I/F) 608, a bus line 610, a Laser Diode (LD) driver 6111, and a MEMS controller 615.

The FPGA 600 is configured to cause the LD driver 6111 to operate a Laser Diode (LD) to be described later in accordance with the image data, and to cause the MEMS controller 615 to operate the optical deflector 15. The CPU 602 is configured to control operations of the HUD apparatus 100. The ROM 604 is configured to store an image processing program for controlling the operations of the HUD apparatus 100. The RAM 606 is used as a work area of the CPU 602. The I/F 608 is an interface to allow the HUD apparatus 100 to communicate with an external controller. For example, the I/F 608 is coupled to a Controller Area Network (CAN) of the automobile.

<Functional Block of HUD Apparatus>

FIG. 3 is a block diagram of a functional configuration of the HUD apparatus 100. As illustrated in FIG. 3, the HUD apparatus 100 includes a vehicle information input unit 800, an external information input unit 802, an image data generating unit 804, and an image rendering unit 806. The vehicle information input unit 800 is configured to receive vehicle information (i.e., information including a vehicle speed, a mileage, a location of a target object, lightness of an external environment, etc.) from the CAN, for example. The external information input unit 802 is configured to receive information on the outside of the vehicle from an external network (e.g., navigation information from a car navigation system installed in the vehicle, etc.). The image data generating unit 804 is configured to generate image data of an image to be rendered in accordance with the information received from the vehicle information input unit 800 or the information received from the external information input unit 802. The image rendering unit 806 includes a control unit 8060, and is configured to render an image based on the received image data. The image data generating unit 804 and the control unit 8060 are enabled by the FPGA 600. The image rendering unit 806 is enabled by the FPGA 600, the LD driver 6111, the MEMS controller 615, the optical scanning unit 10, the screen 30, and the concave mirror 40.

<Configuration of Light Source Unit>

FIG. 4 illustrates a configuration of the light source unit 11. As illustrated in FIG. 4, the light source unit 11 includes a plurality of (e.g., three) light-emitting elements 111R, 111B, and 111G, each having one or more light-emitting points. Each of the light-emitting elements 111R, 111B, and 111G may be a laser diode (LD). The light-emitting elements 111R, 111B, and 111G emit light beams with mutually different wavelengths λR, λG, and λB, respectively. For example, λR is 640 nanometers, λG is 530 nanometers, and λB is 445 nanometers. In the following, the light-emitting elements 111R, 111B, and 111G are also referred to as LD 111R, LD 111G, and LD 111B, respectively. Light fluxes of the wavelengths λR, λG, and λB that have been emitted from the LD 111R, the LD 111G, and the LD 111B are respectively coupled by corresponding coupling lenses 112R, 112G, and 112B to a subsequent optical system. The light fluxes that have been coupled are shaped by corresponding aperture members 113R, 113G, and 113B. An aperture shape of each of the aperture members 113R, 113G, and 113B may have any of various shapes including a circle, an ellipse, a rectangle, and a square, in accordance with a divergence angle of the light fluxes. Then, the light fluxes that have been shaped by the corresponding aperture members 113R, 113G, and 113B are combined by a combining element 115 into an optical path. Specifically, the combining element 115 may be a plate-shaped or prism-shaped dichroic mirror configured to reflect or penetrate the light fluxes in accordance with the wavelength, and to combine the light fluxes into such a single optical path. The combined light fluxes are led by a lens 119 to a reflecting surface of the optical deflector 15. The lens 119 may be a meniscus lens having a concave surface facing the optical deflector 15.

<Configuration of Optical Deflector>

FIG. 5 illustrates a configuration of the optical deflector 15. The optical deflector 15 may be a two-axis MEMS scanner produced by a semiconductor manufacturing process. As illustrated in FIG. 5, the optical deflector 15 includes a mirror 150 having a reflecting surface, and a pair of meandering units 152, each of which includes a plurality of beams aligned in an α axis where two adjacent beams are coupled so as to meander at a turnaround point. Such two adjacent beams included in each of the meandering units 152 include a beam-A 152a and a beam-B 152b. The meandering units 152 are supported by a frame member 154. The plurality of beams respectively include a plurality of piezoelectric members 156 (e.g., PZT). By applying different voltages to the piezoelectric members 156 of the two adjacent beams included in each of the meandering units 152, the two adjacent beams are deflected in different directions, and such deflections of the two adjacent beams are accumulated. Then, the mirror 150 rotates around α axis (i.e., vertical direction) by a large angle. This configuration enables optical scanning in the vertical direction around α axis at a low voltage. In contrast, regarding the optical scanning in the horizontal direction around β axis, resonance using a torsion bar spring coupled to the minor 150 is adopted.

Although the HUD apparatus 100 instantaneously projects only a point image corresponding to a laser beam diameter, the HUD apparatus 100 scans the laser beam at a very high speed. Hence, an afterimage fully remains in human eyes in a one-frame image. By utilizing such an afterimage phenomenon, it is possible to make a viewer perceive an image being projected on a "display area". In fact, the concave mirror 40 and the front windshield 50 are configured to reflect the image being displayed on the screen 30 to let the viewer perceive the reflected image as the virtual image I in the "display area". With the above-described mechanism, in order not to display the virtual image I, the light emission from the LD can be stopped. In other words, with respect to the "display area", it is possible to set the lightness to zero in any other areas than the area where the virtual image is to be displayed.

Specifically, the imaging position of the virtual image I formed by the HUD apparatus 100 can be any position within a predetermined "display area" where the virtual image I is formable. Such a predetermined "display area" can be determined by a design specification at the design phase of the HUD apparatus 100.

By adopting the "laser scanning method" as described above, for the area where the display is not desired, it is possible to take actions such as to turn off the LD when there is no need for display or to reduce the light quantity.

In contrast, in the "panel method" for forming the intermediate image on an imaging device such as a liquid crystal panel or a DMD panel, there is a need for illuminating the entire panel. Hence, as to an image signal, even in a case of black display that does not display an image, it is difficult to eliminate the image signal completely in consideration of characteristics of the liquid crystal panel or the DMD panel. For this reason, a black portion might appear stereoscopically. However, in the laser scanning method, it is possible to eliminate such a black portion that appears stereoscopically.

The FPGA 600 controls light-emitting intensities, lighting timings, and optical waveforms of the light-emitting elements 111R, 111B, and 111G in the light source unit 11 for light emissions. As illustrated in FIG. 6, the light fluxes that have been emitted from the light-emitting elements 111R, 111B, and 111G and have been combined into the optical path, are two-dimensionally deflected around the a axis and β axis by the optical deflector 15. Then, the deflected light fluxes are irradiated as scanning beams on the screen 30 via the scanning minor 20 (see FIG. 1). That is, the screen 30 is two-dimensionally scanned by the scanning beams. Note that in FIG. 6, an illustration of the scanning minor 20 is omitted.

The scanning beams, while vibration-scanning (reciprocation-scanning) a scanning range of the screen 30 in a main-scanning direction at a high frequency of approximately 20000 Hz to 40000 Hz, performs one-way scanning in a sub-scanning direction at a low frequency of approximately several tens of Hz. In other words, raster scanning is performed. At this time, rendering of pixels and displaying of the virtual image are enabled by controlling the light emitted from the light-emitting elements in accordance with the scanning position (position of the scanning beam).

A period of rendering one screen display that is a scanning period needed for scanning one frame (one cycle of two-dimensional scanning) can be several tens of milliseconds, because a sub-scanning frequency is several tens of Hz as described above. For example, when a main-scanning frequency is 20000 Hz and a sub-scanning frequency is 50 Hz, the scanning period needed for scanning one frame is 20 milliseconds.

As illustrated in FIG. 7, the screen 30 includes an image area 30a (effective scanning area) in which an image is rendered (light modulated in accordance with the image data are emitted), and a frame area 30b that surrounds the image area 30a.

Herein, the entire area that can be scanned by the optical deflector 15 is referred to as "scanning range". The scanning range includes the image area 30a and part of the frame area 30b (portions near outer edges of the image area 30a) in the screen 30. In FIG. 7, the trajectory of the scanning line in the scanning range is represented by zigzag lines. In FIG. 7, the number of scanning lines illustrated is lower than the actual number of scanning lines for simplicity.

The image area 30a of the screen 30 includes a transmissive element having a light-diffusing effect such as a microlens array, for example. The image area 30a may not be limited to a rectangle or a plane surface, but may be a polygon or a curved surface. The screen 30 may be a flat plate or a curved plate without the light-diffusing effect. The image area 30a may include a reflective element with the light-diffusing effect such as a micromirror array, for example, depending on the device layout.

In the following, diffusion and occurrence of coherent noise in the microlens array used in the image area 30a of the screen 30 will be described by referring to FIG. 8A and FIG. 8B.

FIG. 8A illustrates a microlens array 852. The microlens array 852 has a fine convex lens structure in which fine convex lenses 851 are aligned. A light flux diameter 857 of an "image-displaying beam" 853 is smaller than a size 856 of the fine convex lens 851. In other words, the size 856 of the fine convex lens 851 is larger than the light flux diameter 857. Note that in one embodiment in the description, the image-displaying beam 853 may be a laser light flux with a light intensity distribution of Gaussian distribution around the light flux center.

Accordingly, the light flux diameter 857 can be a distance in a radial direction of the light flux, in which the light intensity drops to "$1/e^2$" in the light intensity distribution.

In FIG. 8A, the light flux diameter 857 is illustrated to have almost the same size as the size 856 of the fine convex lens 851. However, the light flux diameter 857 may not have the same size as the size 856 of the fine convex lens 851. The light flux diameter 857 may have any size that is not larger than the size 856 of the fine convex lens 851.

In FIG. 8A, the image-displaying beam 853 fully enters a single fine convex lens 851, and is converted into a diffusion light flux 854 having a divergence angle 855. Note that, in the following description, the "divergence angle" is also referred to as "diffusion angle".

In the state of FIG. 8A, a single diffusion light flux 854 is illustrated. Because there is no light flux to interfere with, no coherent noise occurs. The size of the divergence angle 855 can be set appropriately in accordance with the shape of the fine convex lens 851.

In FIG. 8B, a pixel-displaying beam 811 has a light flux diameter that is double an arrangement pitch 812 of the fine convex lens 851. The pixel-displaying beam 811 enters over two fine convex lenses 813 and 814. In such a case, the pixel-displaying beam 811 is diffused by the two fine convex lenses 813 and 814 into two divergence light fluxes 815 and 816, respectively. The two divergence light fluxes 815 and 816 overlap each other in an area 817, interfere with each other in the area 817, and generate the coherent noise.

Returning back to FIG. 7, a peripheral area (part of the frame area 30b) of the image area 30a in the scanning range includes a synchronization detecting system 60 including a light-receiving device. In FIG. 7, the synchronization detecting system 60 is arranged on the −X side and on a corner of the +Y side in the image area 30a. In the following description, X direction denotes the main-scanning direction of the screen 30 and Y direction denotes the sub-scanning direction.

The synchronization detecting system 60 is configured to detect an operation of the optical deflector 15, and to output to the FPGA 600 a synchronization signal for determining a scanning start timing or a scanning end timing.

<Details>

In a case of Augmented Reality (AR) or Mixed Reality (MT) display using an HUD apparatus for superimposing information as a virtual image on the real world (e.g., forward scenery) to match geometrically, there is a concern that a viewer (e.g., driver) might feel uncomfortable or fatigued depending on the displaying method.

Therefore, inventors of the present disclosure have introduced a technique for displaying a virtual image without giving a viewer any uncomfortable or fatigued feel. Such a technique will be described below in detail.

In general, in the technique for superimposing and displaying a virtual image using the HUD apparatus, there are basically two methods for geometrically matching the virtual image with the real world.

In the first method, as illustrated in FIG. 9, a virtual image is presented in a display area when the display area is viewed from a viewer, as if the virtual image sticks to the forward scenery (e.g., road surface ahead) of a vehicle in which the HUD apparatus is installed. The first method can be mainly used for the purpose of indicating distance information in the depth direction to the viewer in an easily understandable manner. The virtual images suited to be displayed in the first method may include, for example, a guide sign for guiding the course of the vehicle as illustrated in FIG. 10, an inter-vehicle distance indication for indicating the inter-vehicle distance between the vehicle and a preceding vehicle as illustrated in FIG. 11, and an indicator for indicating another vehicle as illustrated in FIG. 12.

In the second method, as illustrated in FIG. 13 and FIG. 14, a virtual image is presented in a display area when the display area is viewed from a viewer, as if the virtual image virtually stands up in the forward scenery (e.g., road surface ahead) of a vehicle in which the HUD apparatus is installed. The second method can be used for the purpose of informing a presence of a target object by use of the virtual image or can be used when the virtual image does not have to be displayed as if the virtual image sticks to the road surface. The virtual images suited to be displayed in the second method may include, for example, indications for indicating a presence of someone who is present on the road surface ahead of the vehicle (e.g., pedestrian, traffic guide, worker on the road, etc.), a presence of a road sign represented or set up on the road surface ahead of the vehicle, or a presence of an obstacle on the road surface ahead of the vehicle (e.g., barrier for traffic regulation, disabled vehicle, accident vehicle, etc.).

In displaying such forms, shapes of information are changed geometrically for indications, as if such shapes of information are present in the real world to be superimposed for display. Herein, the location in the real world on which the information is desired to be superimposed for display may vary depending on the displayed information.

For example, an inter-vehicle distance, a collision risk degree of colliding with a preceding vehicle, or a desired value of the inter-vehicle distance can be displayed at a timing including some time for a driver to take action after the driver views the display.

Regarding such a timing, the National Highway Traffic Safety Administration (HNTSA) of the United States Department of Transportation specifies in evaluation criteria of New Car Assessment Program (NCAP) that "an alarm is to be given when Time To Collision (TTC) is 2 seconds to 2.4 seconds".

"TTC" is a period that elapses until two vehicles collide and that is calculated by dividing the distance between the vehicle and the preceding vehicle by a relative speed. FIG. 15 illustrates a relationship between the distance for TTC of 2.4 seconds and the relative speed.

In consideration of a vehicle-travelling environment, 20 kilometers/h or more is assumed. In such an environment, from FIG. 15, the lower limit of a distance range in which the virtual image is superimposed for display can be 13 meters with the vehicle front end being used as a reference. Note that according to a positional relationship between a viewpoint position of the viewer and the vehicle front end, the lower limit of the distance range in which the virtual image is superimposed for display can be changed from the distance with the vehicle front end being used as the reference (13 meters) to a distance with the viewpoint position being used as the reference (approximately 13 meters to 16 meters).

In a case where the virtual image is superimposed on a target object for display, for example, a road sign or a pedestrian, information of the target object can be acquired from Advanced Driver Assistance System (ADAS). In ADAS, a millimeter-wave radar, a stereo camera or a monocular camera, and Light Detection and Ranging or Laser Imaging Detection and Ranging (LIDAR) are utilized in a mixed manner. However, detectable ranges of the above-described devices have limitations, and the devices are generally used in accuracy-guaranteed ranges. Hence, the upper limit of the distance range in which the virtual image is superimposed for display can be set at the maximum detection distance of the ADAS (e.g., 200 meters). (However, the upper limit may be set at the maximum detection distance of the ADAS or shorter, in relation to design conditions of the HUD apparatus to be described later).

A person's right and left eyes are located at positions separated from each other. Hence, images that are respectively being projected on retinas of the right and left eyes differ depending on the distance between the right and left eyes. Such a difference becomes smaller, as the distance between a target object and the eyes becomes longer, and such a distance becomes larger, as the distance between the target object and the eyes becomes shorter. The human brain perceives a depth by recognizing the difference between the images of the target object projected on the right and left eyes.

The HUD apparatus is, for example, an in-vehicle display apparatus configured to display information as a virtual image in front of a vehicle driver. Such information is visibly displayed as a virtual image via a transmissive reflector also called front windshield or combiner so as to overlap the forward scenery of the driver. By adjusting a geometrical shape of the information to be displayed as the virtual image to match the real world, the above-described superimposing and displaying enables the driver to perceive the information as if the information is present at a given location in the real world.

The virtual image (hereinafter, referred to as "display image") displayed by the HUD apparatus, however, is two-dimensionally projected in the display area, which is determined in the design phase of the HUD apparatus. Hence, even when the shape and color shade are adjusted as if the display image is present at a given location in the real world, for example, on the road surface to which the viewpoint of the driver is directed, there will be a difference in projection, namely parallax on the retinas of the right and left eyes because of the difference in distance to the virtual image between the right and left eyes.

As illustrated in FIG. 16, $\theta_{scene}$ represents a convergence angle made by sight lines from the right and left eyes when the viewer views a real object that is a target object on which the virtual image is to be superimposed (i.e., the target object present in the real world), $\theta_{HUD}$ represents a convergence angle made by sight lines from the right and left eyes when the viewer views the virtual image, and an absolute value of $\theta_{scene}\theta_{HUD}$ ($|\theta_{scene}-\theta_{HUD}|$) represents a parallactic angle $\theta(°)$. The convergence angle can be calculated using the following expression (1). Specifically, $\theta_{scene}$ can be calculated in the following expression (1) when x (m) is a distance between both eyes and L (m) is a distance between the real object and the eyes. $\theta_{HUD}$ can be calculated also in the following expression (1) when x (m) is a distance between both eyes and L (m) is a distance between the virtual image and the eyes in the following expression (1).

[Math. 1]

$$\theta_{scene} = \frac{180}{\pi} \times 2\tan^{-1}\left(\frac{x}{2L}\right) \qquad (1)$$

When the parallactic angle θ exceeds one degree, it can be considered that the viewer perceives a double image and feels uncomfortable or fatigued increasingly.

FIG. 17 illustrates a relationship of the parallactic angle that is calculated using the distance between the viewpoint position of the viewer and the real object on which the display image is superimposed (target object present in reality on the background of the display area in the forward scenery), versus the distance between the viewpoint position of the viewer and the display image (virtual image). The values of parallactic angle in FIG. 17 are calculated in the above expression (1) with the distance X between both eyes being set at 65 millimeters, which is the average value of human beings.

By using the upper and lower limits of the range of the distance in which the display image is superimposed and which is determined according to the above-described reasons, and a condition where the parallactic angle is one degree or smaller, it is possible to determine an appropriate distance range between the display image and the viewpoint position of the viewer (hereinafter, also referred to as "appropriate distance range"), in superimposing the display image. Note that as is understood by FIG. 17, as the real object on which the display image is superimposed becomes farther, the parallactic angle θ becomes larger. Hence, the upper limit of the appropriate distance range can be set at a maximum detection distance of ADAS or less and at a parallactic angle θ of one degree or smaller.

In addition, the display area (virtual image displayable range) of the HUD apparatus is limited. Therefore, the position of the display area can be determined so that the road surface within an appropriate distance range from the viewpoint position of the viewer is included in the display area. Such a method for determining the position of the display area is especially advantageous in the case of displaying the virtual image as if the virtual image sticks to the road surface ahead (e.g., in a case of expressing a sense of depth in two dimensions). In a case of displaying the virtual image as if the virtual image stands up vertically on the road surface, when the parallactic angle θ is one degree or smaller, it is possible to express a sense of perspective by changing the size of the display image.

The HUD apparatus configured as described above enables the virtual image to be superimposed on the real object for display without giving a viewer any uncomfortable or fatigued feel.

Next, a method for determining the position of the display area will be described with examples.

As illustrated in FIG. 18, first, the upper limit and the lower limit of the appropriate distance range are set. The upper limit is set with the maximum detection distance of ADAS as described above. The lower limit is determined in accordance with system demands in consideration of the vehicle-travelling environment as described above.

Next, as illustrated in FIG. 19, the position of the display area is determined to display the virtual image within the appropriate distance range. Here, note that only a position in the vertical direction and a position in the front-rear direction of the display area with respect to the vehicle are determined. A position in the left-right direction of the display area with respect to the vehicle is to be determined under another condition. For example, the position in left-right direction of the display area with respect to the vehicle can be determined to include a width between traffic lanes in which the vehicle is travelling, in the upper limit of the appropriate distance range. Further, the horizontal direction of the display area corresponds to the left-right direction of the vehicle.

As illustrated in FIG. 20, finally, a distance $L_{HUD}$ is set so that the parallactic angle θ is one degree or smaller. The parallactic angle θ is a difference between the convergence angle to the center of the lower limit in the appropriate distance range (position of a distance $L_{Real}$ from the viewpoint position of the viewer in FIG. 20) and a convergence angle to the center of a bottom end of the display area (position of a distance $L_{HUD}$ from the viewpoint position of the viewer in FIG. 20). Here, the center of the bottom end of the display area and the center of the lower limit in the appropriate distance range are both defined by using the distance from the viewpoint position of the viewer, but may be defined by using distances parallel to the road surface such as $L'_{HUD}$ and $L'_{Real}$ in FIG. 20.

Similarly, the distance between the center of a top end in the display area and the viewpoint position of the viewer is set so that the parallactic angle θ is one degree or smaller. The parallactic angle θ is a difference between the convergence angle relative to the center of the upper limit in the appropriate distance range and the convergence angle relative to the center of the top end in the display area. Here, the top end of the display area and the upper limit in the appropriate distance range are defined by the distance from the viewpoint position of the viewer, but may be defined with distances parallel to the road surface.

Note that the image-forming position of the virtual image (position of the virtual image in the display area) can be set by, for example, a curvature (power) of the scanning mirror 20, the concave mirror 40, or a transmissive reflector (e.g., front windshield 50).

In the above description, the position of the display area is set so that the parallactic angle θ is one degree or smaller in both cases, where the parallactic angle θ is a difference between the center of the bottom end of the display area and the center of the lower limit in the appropriate distance range and where the parallactic angle θ is a difference between the center of the top end of the display area and the center of the upper limit in the appropriate distance range, when the viewer simultaneously views the virtual image and the forward scenery. However, the position of the display area is not limited to the above-described parallactic angles.

For example, the position of the display area may be set so that the parallactic angle θ is one degree or smaller, in a case where the parallactic angle θ is a difference between the center of the top end of the display area (here, position in the display area with the shortest distance from the viewpoint position of the viewer) and at least one of the left end and the right end of the upper limit in the appropriate distance range (position in the appropriate distance range with the longest distance from the viewpoint position of the viewer).

As is understood from the above description, the "appropriate distance range" is set so that the parallactic angle θ is one degree or smaller. Note that it has been found that in a case where a distance D between the viewpoint position of the viewer and the image-forming position of the virtual image is, for example, four meters, the parallactic angle θ is one degree or smaller when the distance between the viewpoint position of the viewer and a target object is two meters or more and 1000 meters or less. It has also been found that in a case where the distance D between the viewpoint position of the viewer and the image-forming position of the virtual image is, for example, six meters or more, the parallactic angle θ is one degree or smaller even when the target object is located at an extremely far position. As the distance D becomes shorter, the optical path length can be shorter in the HUD apparatus. Thus, the size of the HUD apparatus can be reduced.

In consideration that the HUD apparatus 100 is installed in a vehicle, a target object present at 1000 meters or more ahead of the vehicle can be handled by the setting of the distance D at four meters to six meters. Such a setting is sufficient in practical use and is advantageous in reducing the size of the HUD apparatus 100. The distance D corresponds to $L_{HUD}$ or $L'_{HUD}$ in FIG. 20.

When the target object that is separated from, for example, two meters or more from the viewpoint position of the viewer can be handled, the HUD apparatus 100 is advantageous in practical use. In other words, there is an extremely low necessity for displaying the virtual image in an extremely close range of two meters or less from the viewpoint position of the viewer. Note that in practical use, no problem can be found when the target object separated from the viewpoint position of the viewer by y meters or more (e.g., from two meters to five meters) can be handled.

The distance D may be set at six meters or more, regardless of type of vehicle in which the HUD apparatus 100 is installed. However, in order to prevent an increase in size of the HUD apparatus 100, the distance D can be set at 10 meters or less.

In the following description, the viewpoint position of the viewer that serves as a reference in designing the HUD apparatus 100 is referred to as a "reference viewpoint".

The viewpoint position of the viewer that serves as the reference in designing a vehicle can be set at a height of H meters above the ground (e.g., approximately 1.2 meters in a case of a standard-sized passenger car).

In fact, however, depending on the physical difference in viewer (e.g., driver), the height of the viewpoint position of the viewer varies within a height range including a middle value of a height H (m) above the ground plus or minus 10% the length of a vertical line J (m) virtually extending from the height H (m) down to a seating face of the driver's seat. In such a case, J (m) indicates an average sitting height of drivers.

Hence, even when the height of the reference viewpoint is set within the above-described height range and the virtual image is displayed in the display area to overlap the appropriate distance range when the virtual image is viewed from the reference viewpoint, at least part of the virtual image might not be viewed depending on the actual height of the viewpoint position of the viewer or depending on the position on which the virtual image is superimposed in the appropriate distance range.

Therefore, the inventors of the present disclosure have found a method for setting the reference viewpoint and the display area as illustrated in FIG. 21 to FIG. 25. In FIG. 21 to FIG. 25, it is assumed that the shapes and sizes of the display areas are identical, the display area faces perpendicularly to the road surface, and the top end of the display area is lower than the lower limit of the height range. Note that the display area may be inclined forward with respect to the road surface.

In an example of FIG. 21, first, the height of a reference viewpoint B is set at the height H above the ground (height of the middle value in the height range). The display area is set such that the entire appropriate distance range is included in the display area when the display area is viewed from the reference viewpoint B; such that a first range that is 70% or more of the appropriate distance range is viewed in the display area, when the display area is viewed from a viewpoint P that is located above the middle value of the height range by 10% the length of the vertical line J (the viewpoint P denotes the upper limit of the height range, which is the height H above the ground+0.1 J); and such that a second range that is 70% or more of the appropriate distance range is included in the display area, when the display area is viewed from a viewpoint Q that is located below the middle value of the height range by 10% the length of the vertical line J (the viewpoint Q denotes the lower limit of the height range, which is the height H above the ground−0.1 J). In such a case, by displaying the virtual image in the display area to overlap an overlapping range of the first and second ranges (e.g., a range of 60% or more of the appropriate distance range), the entire virtual view can be viewed from a viewpoint at any given height within the height range. Note that the position of the display area can be set by determining an angle θ overlooking the top end of the display area from the reference viewpoint B, so that the entire appropriate distance range can be included in the display area when the display area is viewed from the reference viewpoint B.

In an example of FIG. 22, next, the height of the reference viewpoint B is set at the height H above the ground+0.05 J. The display area is set such that the entire appropriate distance range is included in the display area when the display area is viewed from the reference viewpoint B; such that a first range that is 80% or more of the appropriate distance range is included in the display area, when the display area is viewed from the viewpoint P that is located above the middle value of the height range by 10% the length of the vertical line J (the viewpoint P denotes the upper limit of the height range, which is the height H above the ground+0.1 J); and such that a second range that is 80% or more of the appropriate distance range is included in the display area, when the display area is viewed from the viewpoint Q that is located below the middle value of the height range by 10% the length of the vertical line J (the viewpoint Q denotes the lower limit of the height range, which is the height H above the ground−0.1 J). In such a case, by displaying the virtual image in the display area to overlap the virtual image in the overlapping range of the first and second ranges (e.g., a range of 70% or more of the appropriate distance range), the entire virtual view can be viewed from a viewpoint at any height within the height range.

In an example of FIG. 23, next, the height of the reference viewpoint B is set at the height H above the ground+0.1 J (i.e., the reference viewpoint B matches the viewpoint P). The display area is set such that the entire appropriate distance range is included in the display area when the display area is viewed from the reference viewpoint B; and such that a given range that is 80% or more of the appropriate distance range is included in the display area, when the display area is viewed from the viewpoint Q that is located below the middle value of the height range by 10% the length of the vertical line J (i.e., the viewpoint Q denotes the lower limit of the height range, which is the height H above the ground−0.1 J). In such a case, by displaying the virtual image in the display area to overlap the virtual image in the overlapping range of the given range and the appropriate distance range (e.g., a range of 80% or more of the appropriate distance range), the entire virtual view can be viewed from a viewpoint at any height within the height range.

In an example of FIG. 24, next, the height of the reference viewpoint B is set at the height H above the ground−0.05 J. The display area is set such that the entire appropriate distance range is included in the display area when the display area is viewed from the reference viewpoint B; such that a first range that is 60% or more of the appropriate distance range is included in the display area, when the display area is viewed from the viewpoint P that is located above the middle value of the height range by 10% the length of the vertical line J (the viewpoint P denotes the upper limit of the height range, which is the height H above the ground+0.1 J); and such that a second range that is 60% or more of the appropriate distance range is included in the display area, when the display area is viewed from the viewpoint Q that is located below the middle value of the height range by 10% the length of the vertical line J (the viewpoint Q denotes the lower limit of the height range, which is the height H above the ground−0.1 J). In such a case, by displaying the virtual image in the display area to overlap the virtual image in the overlapping range of the first and second ranges (e.g., a range of 50% or more of the appropriate distance range), the entire virtual view can be viewed from a viewpoint at any height within the height range.

In an example of FIG. 25, next, the height of the reference viewpoint B is set at the height H above the ground−0.1 J (i.e., the reference viewpoint B matches the viewpoint Q). The display area is set such that the entire appropriate distance range is included in the display area when the display area is viewed from the reference viewpoint B; and such that a given range that is 40% or more of the appropriate distance range is included in the display area, when the display area is viewed from the viewpoint P that is located above the middle value of the height range by 10% the length of the vertical line J (i.e., the viewpoint P denotes the upper limit of the height range, which is the height H above the ground+0.1 J). In such a case, by displaying the virtual image in the display area to overlap the virtual image in the overlapping range of the given range and the appropriate distance range (e.g., a range of 40% or more of the appropriate distance range), the entire virtual view can be viewed from a viewpoint at any height within the height range.

Heretofore, examples of FIG. 21 to FIG. 25 have been described. Under the condition that the shapes and sizes of the display area are identical, as the setting level becomes higher within the height range of the reference viewpoint B, the overlapping range can be made wider. The range in which the virtual image can be superimposed can be broader so that the entire virtual image can be viewed from a viewpoint at any height within the appropriate distance range.

In particular, by setting the setting level within the height range of the reference viewpoint B at the height H above the ground−0.05 J or more, the position of the display area can be set to make available an overlapping range that is 50% or more of the appropriate distance range (a range in which the virtual image can be superimposed so that the entire virtual image can be viewed when the display area is viewed from a viewpoint at any height within the height range).

Additionally, by setting the setting level within the height range of the reference viewpoint B at the height H above the ground (the height of the middle value of the height range) or more, the position of the display area can be set to make available an overlapping range that is 60% or more of the appropriate distance range (the range in which the virtual image can be superimposed so that the entire virtual image can be viewed when the display area is viewed from a viewpoint at any height within the height range).

Further, by setting the setting level within the height range of the reference viewpoint B at the height H above the ground+0.05 J or more, the position of the display area can be set to make available the overlapping range that is 70% or more of the appropriate distance range (the range in which the virtual image can be superimposed so that the entire virtual image can be viewed when the display area is viewed from a viewpoint at any height within the height range).

By increasing the size of the display area, it is easy to widen the overlapping range within the appropriate distance range (the range in which the virtual image can be superimposed so that the entire virtual image can be viewed when the display area is viewed from a viewpoint at any height within the height range). However, the size of the display area and the reduction in size of the apparatus has a trade-off relationship. An increase in size of the display area unnecessarily will lead to an increase in size of the apparatus. Thus, an increase in size of the display area is not an appropriate solution.

Hence, in one embodiment, as described above, regarding the display area having a limited size, the inventors have carefully considered the height of the reference viewpoint and the position of the display area. Accordingly, within the appropriate distance range, it is possible to widen the range where the virtual image can be superimposed so that the entire virtual image can be viewed, when the virtual image is viewed from a viewpoint at any height within the height range.

With respect to variations in height of the viewpoint position depending on the physical difference in viewer, the entire virtual image that has been superimposed within the appropriate distance range can also be viewed by adjusting the position of the display area.

The HUD apparatus 100 may include an adjustor configured to manually or automatically adjust the position of the display area. The adjustor may include, for example, a mechanism capable of changing the position or orientation of the entire HUD apparatus 100 or the concave minor 40. In order to manually adjust the position of the display area, an operation unit is provided for a user (i.e., viewer) to operate the mechanism. In order to automatically adjust the position of the display area, a detecting unit (e.g., camera) configured to detect the viewpoint of the user (i.e., viewer) is provided.

After the position of the display area is adjusted, in consideration of the relationship between the position of the display area and the viewpoint position after the adjustment, the displayed image (virtual image) of the information can be changed geometrically as if the information is present at a position in the real world on which the information is superimposed for display.

In a general HUD apparatus, it is understood that a portion in the display area where the virtual image is not displayed is tinged black and that an area where the information is not expected to be displayed is slightly luminous (i.e., a so-called postcard can be seen). This phenomenon deteriorates the intended effect of the viewer perceiving the virtual image that overlaps the road surface ahead of the vehicle. Therefore, an effect of augmented reality can be maintained by applying the laser scanning method in one or more embodiments.

<Derivation of Condition where Postcard is Recognized>

Generally speaking, although a luminance difference distinction threshold (i.e., threshold at which humans can recognize the luminance difference) changes depending on the luminance in environment, it is said that luminance of threshold/luminance of background is approximately $1/100$ to $1/1000$. In the following test results, conditions on the luminance of background were changed with such values being preconditions.

The luminance by which the postcard was recognized was examined in detail. To be specific, luminance L_P (luminance of an area where the virtual image is not displayed (non-virtual image area), in the display area) varied by changing the luminance of the image to be rendered on the screen 30, the value of L_P at which the postcard began to be recognized was measured with a two-dimensional luminance meter. Relationships between L_B and L_P are shown in FIG. 29.

In the measurements, L_B/L_P is defined to be a contrast of a non-virtual image rendering area L_P with respect to a luminance of background L_B, when the display area is viewed from a viewer V. Regarding the luminance of background L_B, three types whose experimental environments could be established were set to the conditions. Such three types of luminance of background L_B were assumed to night-time road surface luminance, tunnel-lighting road surface luminance, and cloudy day-time road surface luminance, in the order of lower luminance. L_P was changed with respect to each L_B, and each contrast L_B/L_P was calculated for L_P area where the postcard was not recognized. Table 1 shows the results.

TABLE 1

| Luminance of Non-Virtual Image Area L_P (cd/m$^2$) | Luminance of Background L_B (cd/m$^2$) | L_B/L_P |
|---|---|---|
| 0.1 | 1.5 | 30 |
| 0.5 | 46.2 | 87 |
| 2.8 | 213.0 | 77 |

As shown in Table 1, the luminance L_P at which the postcard was recognizable was varied depending on the luminance of background L_B. It has been found that the postcard was not recognized when the contrast L_B/L_P was 30 or more, for example, in the case of the luminance of background L_B corresponding to the night-time road surface. Table 1 also shows the values of L_B/L_P that are relatively close to each other in the cases where values of L_B are 46.2 cd/m$^2$ and 213.0 cd/m$^2$. According to Table 1, the contrast at which the postcard is recognized is generally constant, when the luminance of background L_B has a certain level of luminance (e.g., 46.2 cd/m$^2$ in the experiment) or more. In particular, when L_B/L_P is 100 or more, no postcard can be recognized regardless of the luminance of background L_B.

As described above, it has been found that when L_B/L_P is approximately 100 or more, no postcard can be recognized regardless of the luminance L_P or the luminance of background L_B. In other words, in the HUD apparatus 100, it has been found that it is possible to set the value of luminance L_P at which no postcard can be recognized (no postcard is generated substantially). However, as is understood by Table 1, depending on conditions, the contrast L_B/L_P may not be set at 100 or more.

In the HUD apparatus 100, as the luminance of the displayed virtual image is higher, the luminance L_P is higher. As the luminance of the displayed virtual image is lower, the luminance L_P is lower. Accordingly, in the image data generating unit 804 of the HUD apparatus 100, by adjusting the luminance of the displayed virtual image so that the contrast L_B/L_P takes a given value or more, the state where no postcard can be recognized is achievable. Herein, such a given value of L_B/L_P may be 100, for example. In addition to the image data generating unit 804, in any optical design phase, the HUD apparatus 100 may be designed so that L_B/L_P may be 100 or more, when the HUD apparatus 100 is used.

In the panel methods, however, it is difficult to set the contrast L_B/L_P at 100 or more, whereas in the laser scan methods, it is easy to set the contrast L_B/L_P at approximately 1000 to 10000. Accordingly, in order to achieve the state where no postcard can be recognized, the laser scanning methods can be applied.

Although the laser scanning method is applied, when the virtual image being displayed is high in luminance, the luminance of the postcard becomes higher in accordance with the size of the virtual image, in some cases. Measurement experiments for measuring the size of the virtual image and the luminance of the postcard were conducted. Specifically, when the luminance of background L_B is 10000 cd/m$^2$, the laser beams are emitted from the laser light source so that the display image is sufficiently visible. In such a state, the luminance of postcard L_P was measured, while the size (area of the intermediate image formed on the screen 30) of the virtual image was varied. As a result of the measurement, it has been found that when the ratio (area ratio) of a virtual image area to the entire display area fell below 45%, the contrast L_B/L_P was 100 or more.

Therefore, when the virtual image is displayed, the total area of the virtual images being displayed simultaneously with respect to the entire display area can have a given area ratio or less (e.g., approximately 45% or less). In such a configuration, even when the upper limit of the luminance of the displayed virtual image is increased to some extent, the contrast L_B/L_P can be set at 100 or more.

Viewers of the HUD apparatus 100 are drivers of vehicles in many cases. Hence, not to hinder the viewer's vision is demanded. From such a perspective, without illuminating the entire display area, the total area of the virtual images being displayed simultaneously can be set at a given area ratio or less (e.g., approximately 45% or less) with respect to the entire display area.

Next, a configuration example of the image data generating unit 804 of the HUD apparatus 100 configured to display a guide sign (see FIG. 10, for example) will be described with reference to FIG. 26.

As illustrated in FIG. 26, the image data generating unit 804 includes a guide information acquiring unit 901 and a guide display data generating unit 902.

The guide information acquiring unit 901 acquires information on a scheduled travelling route of the vehicle (e.g., information on the next right or left turning point on the scheduled travelling route, or nearby shops, facilities, or houses on the scheduled travelling route) via the external information input unit 802 from a car navigation system 200, and transmits the acquired information to the guide display data generating unit 902. Note that the "scheduled travelling route" is set by a user on the car navigation system 200, as appropriate.

The guide display data generating unit 902 generates guide sign data based on the information on the scheduled travelling route that has been received and a guide sign template, and transmits the guide sign data to the control unit 8060 of the image rendering unit 806.

The control unit 8060 controls the LD driver 6111 and the MEMS controller 615 in accordance with the guide sign data that has been received from the guide display data generating unit 902, and displays a guide sign as a virtual image in the display area.

In the above-described manner, by displaying the guide sign related to the scheduled travelling route of the vehicle in the display area that overlaps the forward scenery of the vehicle, the driver is able to recognize the information on the scheduled travelling route without taking eyes away from the forward scenery of the vehicle.

Next, a configuration example of the HUD apparatus 100 configured to display an inter-vehicle distance indication (see FIG. 11, for example) will be described with reference to FIG. 27.

Herein, in addition to the above-described fundamental configuration, the HUD apparatus 100 further includes a laser radar 300 serving as a detecting system configured to detect a position of a target object, as illustrated in FIG. 27. The image data generating unit 804 includes additional configurations and functions to be described later.

Note that the "detecting system" may not be provided only for "indicators". For example, a detecting device used for, for example, vehicular automatic control (e.g., automatic brake or automatic steering) may also be used. When such a "detecting device" is utilized, the HUD apparatus 100 may not include the detecting system.

In short, the "detecting system" or the "detecting device" may be any system or device capable of detecting a presence of a target object and a position of the target object present ahead (including diagonally ahead) of the vehicle. Instead of the laser radar (e.g., radar including a semiconductor laser used as the light source), a radar with an LED used as the light source, a millimeter wave radar, an infrared radar, a monocular camera, a stereo camera, or any combination of such radars and cameras.

The laser radar 300 includes a light-projecting system including at least one laser light source (e.g., semiconductor laser), a light-receiving system including at least one light-receiving element (e.g., photodiode) configured to receive the light that has been projected from the light-projecting system and reflected by the target object, and a processing system configured to operate a distance to the target object. A projecting range of the laser radar 300 can be a given range including a forward range of the vehicle and a diagonally forward range of the vehicle. The method for measuring the distance by the laser radar 300 may be a direct Time Of Flight (TOF) method or an indirect TOF method. In the direct TOF method, the distance to the target object is measured by calculating a difference in time between a light-emitting timing from the laser light source and a light-receiving timing by the light-receiving element. In the indirect TOF method, the distance to the target object is measured by calculating the difference in time in an operation using a plurality of phase signals obtained by dividing the light-receiving signal received by the light-receiving element into the plurality of phase signals. The light-projecting system may be either a scanning type or a non-scanning type.

The laser radar 300 is installed in or near a front bumper or a rearview mirror, for example. When detecting a target object (here, a preceding vehicle ahead of the vehicle), the laser radar 300 transmits to a vehicle controller 400 three-dimensional position information (also referred to as distance image), which is a detection result.

The vehicle controller 400 is a device configured to control the entire vehicle. The vehicle controller 400 is configured to calculate a current inter-vehicle distance and a relative speed between the vehicle and the preceding vehicle by using the three-dimensional position information of the preceding vehicle and any change in information that has been received, to set a desired value of the inter-vehicle distance based on the relative speed, and to transmit the desired value and the current inter-vehicle distance to the image data generating unit 804 via the vehicle information input unit 800.

The image data generating unit 804 includes an inter-vehicle distance and desired value acquiring unit 903, and an inter-vehicle distance display and desired value data generating unit 904.

The inter-vehicle distance and desired value acquiring unit 903 is configured to acquire the current inter-vehicle distance and the desired value of the inter-vehicle distance from the vehicle controller 400, and transmits the current inter-vehicle distance and the desired value of the inter-vehicle distance to the inter-vehicle distance indication and desired value data generating unit 904.

The inter-vehicle distance display and desired value data generating unit 904 is configured to generate an inter-vehicle distance indication and desired value data, in accordance with the current inter-vehicle distance and the desired value of the inter-vehicle distance that have been received and an inter-vehicle distance indication template (data including a plurality of constituent units extending in the width direction of the vehicle lane and aligning in the length direction of the vehicle lane). Herein, the inter-vehicle distance sign and desired value data may include image data of the inter-vehicle indication and image data of the desired value of the inter-vehicle distance. The inter-vehicle distance display and desired value data generating unit 904 transmits the inter-vehicle distance sign and desired value data that have been generated to the control unit 8060.

The control unit 8060 controls the LD driver 6111 and the MEMS controller 615 in accordance with the inter-vehicle distance indication and the desired value data that have been received, and displays in the display area the inter-vehicle distance indication and the desired value of the inter-vehicle distance as the virtual image.

As described above, as illustrated in FIG. 11, for example, the inter-vehicle distance indication (e.g., for every 10 meters a scale mark that is a gap between adjacent constituent units) and the desired value of the inter-vehicle distance are displayed in the display area overlapping the road surface (including a vehicle lane) between the vehicle and the preceding vehicle, when the display area is viewed from the driver. This configuration allows the driver to easily recognize the current inter-vehicle distance and the lower limit of an appropriate inter-vehicle distance without taking eyes away from the front of the vehicle, and also allows the driver to decelerate the vehicle for such an appropriate inter-vehicle distance. Note that FIG. 11 illustrates a case where the actual inter-vehicle distance is, for example, 30 meters and the desired value of the inter-vehicle distance is, for example, 50 meters.

Next, a configuration example of the image data generating unit 804 in the HUD apparatus 100 configured to display an indicator (e.g., see FIG. 12) will be described with reference to FIG. 28.

In addition to the above-described fundamental configuration, the HUD apparatus 100 further includes the laser radar 300 serving as a detecting system configured to detect a position of a target object, as illustrated in FIG. 28. The image data generating unit 804 includes additional configurations and functions to display an "indicator" to be described later.

The image data generating unit 804 includes a display control unit 905 and an indicator data generating unit 906.

The display control unit 905 sets an indicating direction of the indicator and a display position (hereinafter, also referred to as an "indicator position") of the indicator in the display area, in accordance with the detection result of the laser radar 300, and transmits setting information on the indicating direction and the indicator position to the indicator data generating unit 906. Note that the indicator position can be set at a position near the target object in the display area.

The indicator data generating unit 906 is configured to generate image data of the indicator based on the setting information on the indicating direction and the indicator position that have been received, and transmits the generated image data to the control unit 8060.

The control unit 8060 controls the LD driver 6111 and the MEMS controller 615 in accordance with the image data of the indicator that has been received, and displays the indicator as a virtual image in the display area.

As described above, the indicator for indicating the target object (e.g., preceding vehicle ahead) in the display area overlaps with the forward scenery of the vehicle, as illustrated in FIG. 12, for example. This configuration allows the driver to properly recognize (understand) the position of the target object.

The indicator may be a display indicating any direction with an arrow or a letter V, as illustrated in FIG. 12, for example. Herein, the direction indicated by the indicator is also called an "indicating direction". The indicator may have any size as long as it can be displayed in the display area. Note that in FIG. 12, for example, the indicator is illustrated to have only a two-dimensional shape indicating a two-dimensional position of the target object on a plane perpendicular to a travelling direction of the vehicle. However, in fact, the indicator has a three-dimensional shape indicating a two-dimensional position on the plane perpendicular to the travelling direction of the vehicle and a one-dimensional position in the travelling direction of the vehicle. Such a shape appears to the driver that the indicator is indicating the three-dimensional position of the target object. The indicator has been described as an example. However, in short, any display for indicating the presence of the target object may be applied. For example, a line-shaped or half-moon-shaped indicating display may be presented near the bottom side of the target object.

The HUD apparatus 100 in one or more embodiments, as described heretofore, is a display apparatus configured to irradiate light for forming an image on the front windshield 50 (transmissive reflector) provided in a vehicle (movable body), and to display a virtual image in a display area to overlap the virtual image with scenery outside the movable body. The HUD apparatus 100 includes: an image-forming unit including the light deflector 15, the scanning mirror 20, and the screen 30; and the concave mirror 40 (light-projecting unit) configured to project light for forming the image onto the front windshield 50. When the display area is viewed from a reference viewpoint that is set in the movable body, the scenery of a given distance range (appropriate distance range) from the reference viewpoint is viewed in the display area, and a difference between a first convergence angle from the reference viewpoint to a target object (e.g., road surface ahead, preceding vehicle, person, obstacle, etc.) that is present in the given distance range and a second convergence angle from the reference viewpoint to the virtual image displayed in the display area is at most one degree.

In the above-described configuration, there is a small difference between the convergence angle to the target object present in the given distance range and the virtual image displayed in the display area. Accordingly, it is possible to prevent any uncomfortable or fatigued feel, when a viewer simultaneously views the target object and the virtual image. In other words, according to the HUD apparatus 100, it is possible to improve the simultaneous visibility of the target object and the virtual image.

In contrast, in the technique disclosed by PTL 1, depending on a difference between the distance between the viewpoint position and the target object and the distance between the viewpoint position and the virtual image, when the viewer views the target object and the virtual image simultaneously, the virtual images projected on right and left retinas are largely misaligned. Hence, the virtual image could be seen as a double image, and there is a concern that the viewer might feel uncomfortable or fatigued.

The distance between any point in the display area and the reference viewpoint may be four meters or more and ten meters or less. In such a case, it is possible to make the difference between the convergence angle to the target object present in a given distance range and the convergence angle to the virtual image displayed in the display area one degree or smaller with certainty (see FIG. 17). An increase in size of the HUD apparatus 100 can be prevented. Note that when the display area is set at a position separated from the reference viewpoint by ten meters or more, the size of the optical system will be increased and then the size of the HUD apparatus 100 will be increased.

The difference between the convergence angle to any point in the display area and the convergence angle to an upper point in a given distance range is one degree or smaller, in one or more embodiments. In such a case, it is possible to improve simultaneous visibility of a given point in the display area and a given point in the given distance range.

The top end of the display area may be located at a position lower than the reference viewpoint. In such a case, the road surface ahead of the vehicle can be included in the display area when the display area is viewed from the reference viewpoint. Note that the top end of the display area may be located at a position higher than the reference viewpoint.

The reference viewpoint may be set above the seating face of the driver's seat of the vehicle. The height of the reference viewpoint may be set within a height range including the middle value of the height H (meter) plus or minus 10% the length of the vertical line J virtually extending between the driver's (viewer's) viewpoint in the design phase of the vehicle and the seating face of the driver's seat (given face). In such a case, it is substantially possible to cover the viewer's actual viewpoints.

The first range that is 60% or more of a given distance range may be included in the display area, when the display area is viewed from the upper limit of the height range, and the second range that is 60% or more of a given distance range may be included in the display area, when the display area is viewed from the lower limit of the height range. In these cases, it is substantially possible to address a change in viewpoint position due to a physical difference among viewers, even if, for example, the position of the display area were not adjustable.

The height of the reference viewpoint may be set at a height of the middle value of the height range or higher. In such a case, it is substantially possible to address a change in viewpoint position due to a physical difference among viewers, even if, for example, the position of the display area were not adjustable.

The virtual image may be displayed in the display area to overlap the range where the first and second ranges overlap (overlapping range). In such a case, the entire virtual image is visible, when the display area is viewed from the viewpoint at any height within the height range.

The lower limit of the given distance range may be 13 meters to 16 meters, for example. In such a case, the virtual image can be displayed to overlap a position that is set in consideration of a period of time from when the viewer viewing the virtual image to when the viewer taking action.

The upper limit of the given distance range may be the maximum detection distance or less of, for example, a device configured to detect the distance from the vehicle to the target object. This is because there is no need to superimpose and display the virtual image at a position where the target object (e.g., preceding vehicle, person, bicycle, obstacle, etc.) is not detectable.

The upper limit of the given distance range may be, for example, 200 meters. Currently, detecting devices with a maximum detection distance of 200 meters are widely used.

The position of the display area may be adjustable manually or automatically. In either case, the position of the display area can be adjusted so that the viewer can view the entire virtual image. Accordingly, it is possible to address changes in viewpoint position sufficiently due to physical differences among viewers, and the height of the reference viewpoint may not be set so strictly.

The virtual image may include a sign (e.g., sign sticking to the road surface) that three-dimensionally matches the target object. In such a case, since it is difficult to improve the simultaneous visibility of the virtual image and the target object, the HUD apparatus 100 is advantageous in particular.

The above-described sign that three-dimensionally matches the target object may be an inter-vehicle distance indication that indicates the inter-vehicle distance between the vehicle and the preceding vehicle (preceding object) that is the target object, for example.

The above-described sign that three-dimensionally matches the target object may be a display (e.g., indicating display) for indicating the presence of the target object, for example.

The above-described sign that three-dimensionally matches the target object may be a guide sign relating to, for example, the scheduled travelling route of the vehicle.

The virtual image may include a display that does not three-dimensionally match the target object. In such a case, the simultaneous visibility of the virtual image and the target object can be improved by changing the size of the virtual image, for example. However, even when the size of the virtual image is unchanged, the simultaneous visibility can be improved by the HUD apparatus 100.

The display that does not three-dimensionally match may include at least one of, for example, a display of a target object (such as a preceding vehicle, person, and obstacle), a display indicating information on the vehicle (such as a vehicle speed or fuel level), and a display relating to the scheduled travelling route of the vehicle (such as a guide display for the next turning point, or nearby shops, facilities, or houses on the scheduled travelling route).

According to a vehicle apparatus (movable body apparatus) including the HUD apparatus 100 and a vehicle (movable body) in which the HUD apparatus 100 is installed, it is possible to inform useful information while preventing a viewer (e.g., driver) from feeling uncomfortable or fatigued. Accordingly, an excellent driving support is enabled.

According to a producing method of the HUD apparatus 100 in one or more embodiments, there is provided for displaying a virtual image in a display area to overlap the virtual image with scenery ahead of a vehicle (e.g., scenery outside the movable body). The producing method includes: setting a reference viewpoint in the movable body; and setting a position of the display area to include a given distance range in the scenery from the reference viewpoint, when the display area is viewed from the reference viewpoint. A difference between a first convergence angle to a target object present in the given distance range and a second convergence angle to the virtual image displayed in the display area is at most one degree. In such a case, it is possible to produce the HUD apparatus 100 capable of improving the simultaneous visibility of the target object and the virtual image.

According to a display method in one or more embodiments, there is provided for displaying a virtual image in a display area to overlap the virtual image with scenery outside a movable body. The display method includes: setting a reference viewpoint in the movable body; setting a position of the display area to include a given distance range in the scenery from the reference viewpoint, when the display area is viewed from the reference viewpoint; and displaying the virtual image in the display area to overlap the virtual image with the given distance range, when the display area is viewed from the reference viewpoint. A difference between a first convergence angle to a target object present in the given distance range and a second convergence angle to the virtual image displayed in the display area is at most one degree. In such a case, it is possible to improve the simultaneous visibility of the target object and the virtual image.

In the HUD apparatus in one or more embodiments, the light-projecting unit arranged on a subsequent stage of the screen 30 in an image light forming unit may include the concave mirror 40 (concave mirror). However, the light-projecting unit may include a convex minor, or may include a reflecting mirror disposed between a curved minor (such as the convex minor or the concave mirror) and the screen 30.

In the above-described embodiments, the optical scanning unit includes the scanning mirror 20, but may not necessarily include the scanning minor 20.

In the above-described embodiments, the LD (e.g., end face light-emitting laser) may be used. However, any other laser such as a face light-emitting laser may be used.

In the above-described embodiments, the HUD apparatus is configured to display color images. However, the HUD apparatus may be configured to display monochrome images.

The transmissive reflector is not limited to the front windshield of a vehicle. For example, the transmissive reflector may be a side window or a rear windshield. The point is that the transmissive reflector may be provided in a vehicle in which a viewer views a virtual image, and may be a window member (windshield) through which the viewer views the outside the vehicle.

In the above-described embodiments, the HUD apparatus has been described as one example of being installed in an automobile, for example. However, the HUD apparatus may be installed in any one of movable bodies such as a vehicle, an airplane, or a ship. For example, as a vehicle applied on the vehicle apparatus in one embodiment, not only four-wheeled vehicles but also motorcycles and motor tricycles may be applicable. In this case, a windshield or combiner may be installed as the transmissive reflector. For a power source of the vehicle, for example, an engine, a motor, and a combination of an engine and a motor can be listed.

In the above-described embodiments, the vertical line may virtually extend between the viewpoint in designing the movable body and the "given face", which may be the seating face of the driver's seat. However, in a case where the viewer views the virtual image while standing, for example, a floor face on which the viewer stands may be the "given face".

The specific numeral values and shapes are examples in the above-described embodiments, and can be changed without departing from the scope of the present disclosure.

In the following, a thinking process of the inventors who have achieved the above-described embodiments will be described.

As a display apparatus that allows a driver to recognize information and warnings by shifting a driver's gaze by only a small distance, Heads-Up Displays (HUD) are increasingly expected in the market and technical developments are also progressing. A display image (virtual image) is displayed to overlap the front scenery of the vehicle. Hence, the HUDs that enable Augmented Reality or Mixed Reality have been proposed. The HUDs superimpose information as a virtual image on the real world by geometrically changing the shape of the display image based on the display position of the virtual image and the viewpoint position of the driver.

In existing HUDs that enable Augmented Reality or Mixed Reality, the relationships between a range in the real world on which the virtual image is superimposed and the display position of the virtual image have not been considered.

Therefore, in focusing on the range (e.g., position) in the real world to which the virtual image is superimposed, the virtual images projected on right and left retinas are largely misaligned depending on the relationship between the range (e.g., position) in the real world on which the virtual image is superimposed and the display position of the virtual image. Hence, the virtual image could be seen as a double image, and there is a concern that the viewer might feel uncomfortable or fatigued. In other words, there is a concern that the virtual image might be an annoying display.

For example, PTL 1 discloses a vehicle in which a Heads-Up Display is installed as a driving support device, such that the HUD displays the virtual image to be superimposed on an attention-drawing target for the purpose of drawing attention to the outside.

However, PTL 1 does not disclose any relationship between the position of such an attention-inviting target and the position of the virtual image. Depending on the display position of the virtual image, there is a concern that the virtual image becomes annoying.

Therefore, the inventors have achieved the above-described embodiments for the purpose of making a real object and a virtual image simultaneously visible without annoying the driver, when the virtual image is superimposed on the real object to enable Augmented Reality or Mixed Reality.

The present application is based on and claims the benefit of priority of Japanese Priority Application No. 2016-139286 filed on Jul. 14, 2016 and Japanese Priority Application No. 2017-014181 filed on Jan. 30, 2017, the entire contents of which are hereby incorporated by reference.

REFERENCE SIGNS LIST

15 optical deflector (part of image light generator)
20 scanning mirror (part of image light generator)
30 screen (part of image light generator)
40 concave mirror (part of image light generator)
50 front windshield (transmissive reflector)
100 HUD apparatus (display apparatus)
111R, 111G, 111B semiconductor laser (light source)

The invention claimed is:

1. A display apparatus, comprising:
an optical system configured to irradiate light to form an image on a transmissive reflector provided in a movable body to display a virtual image at a position in a display area on a display surface of the transmissive reflector so that the virtual image overlaps with scenery outside the movable body, wherein
the optical system is configured to irradiate the light to display the virtual image at the position in the display area on the display surface of the transmissive reflector so that (1) a given distance range in the scenery from a set reference viewpoint in the movable body is included in the display area, and (2) a difference between a first convergence angle to a target object present in the given distance range and a second convergence angle to the virtual image displayed in the display area on the display surface of the transmissive reflector is at most one degree.

2. The display apparatus as claimed in claim 1, wherein a distance between a given point in the display area and the reference is four meters or longer and ten meters or shorter.

3. The display apparatus as claimed in claim 1, wherein when the target object is present at a given point of an upper limit in the given distance range and the virtual a is displayed at a given point in the display area, the difference between the first convergence angle and the second convergence angle is at most one degree.

4. The display apparatus as claimed in claim 1, wherein a top end of the display area is located at a position lower than the reference viewpoint.

5. The display apparatus as claimed in claim 1, wherein a height of the reference viewpoint within a height range including a middle value that is a height of a point in designing the movable body plus or minus 10% a length of a vertical line virtually extending between a given face and the height of the point in designing the movable body.

6. The display apparatus as claimed in claim 5, wherein the optical system is configured to irradiate the light to display the virtual image at the position in the display area on the display surface of the transmissive reflector so that a first range that is at least 60% of the given distance range is included in the display area when an upper limit of the height range, and a second range that is at least 60% of the given distance range is viewed in the display area when a lower limit of the height range.

7. The display apparatus as claimed in claim 6, wherein the optical system is configured to irradiate the light to display the virtual image at the position in the display area on the display surface of the transmissive reflector so that the virtual image is displayed in the display area to overlap an overlapping area of the first range and the second range.

8. The display apparatus as claimed in claim 5, wherein the height of the reference point is set higher than the height of the middle value in the height range.

9. The display apparatus as claimed in claim 1, wherein the optical system is configured to irradiate the light to display the virtual image at the position in the display area on the display surface of the transmissive reflector so that a lower limit of the given distance range is 13 meters to 16 meters.

10. The display apparatus as claimed in claim 1, wherein the optical system is configured to irradiate the light to display the virtual image at the position in the display area on the display surface of the transmissive reflector so that an upper limit of the given distance is at most a maximum detection distance of a detector configured to detect a distance between the movable body and the target object.

11. The display apparatus as claimed in claim 1, further comprising circuitry configured to set a vertical position and a front-rear position of the display area of the virtual image so that the difference between the first convergence angle to the target object present in the given distance range and the second convergence angle to the virtual image displayed in the display area is at most one degree.

12. The display apparatus as claimed in claim 1, wherein the optical system is configured to irradiate the light to display the virtual image at the position in the display area on the display surface of the transmissive reflector so that the virtual image includes an indicator that three-dimensionally matches the target object.

13. The display apparatus as claimed in claim 12, wherein the circuitry is further configured to cause the optical system to display the virtual image so that the indicator that three-dimensionally matches the target object indicates a distance between the movable body and a preceding object that is the target object.

14. The display apparatus as claimed in claim 12, wherein the optical system is configured to irradiate the light to display the virtual image at the position in the display area on the display surface of the transmissive reflector so that the indicator that three-dimensionally matches the target object informs a presence of the target object.

15. The display apparatus as claimed in claim 12, wherein the optical system is configured to irradiate the light to display the virtual image at the position in the display area on the display surface of the transmissive reflector so that the indicator that three-dimensionally matches the target object indicates information on a scheduled travelling route of the movable body.

16. The display apparatus as claimed in claim 1, the optical system is configured to irradiate the light to display the virtual image at the position in the display area on the display surface of the transmissive reflector so that another indicator that does not three-dimensionally match the target object is displayed.

17. The display apparatus as claimed in claim 16, wherein the optical system is configured to irradiate the light to display the virtual image at the position in the display area on the display surface of the transmissive reflector so that the another indicator that does not three-dimensionally match the target object includes at least one of an indicator indicating the target object, an indicator indicating information on the movable object, and an indicator relating to a scheduled travelling route of the movable body.

18. A movable body apparatus comprising:
    the display apparatus of claim 1; and
    a movable body in which the display apparatus is installed.

19. A producing method of a display apparatus for displaying a virtual image in a display area on a display surface of a transmissive reflector so that the virtual image overlaps with scenery outside a movable body, the producing method comprising:
    setting a reference viewpoint in the movable body; and
    setting a position of the display area of the virtual image to include a given distance range in the scenery from the reference viewpoint so that a difference between a first convergence angle to a target object present in the given distance range and a second convergence angle to the virtual image displayed in the display area on the display surface of the transmissive reflector is at most one degree.

20. A display method for displaying a virtual image in a display area on a display surface of a transmissive reflector so that the virtual image overlaps with scenery outside a movable body, the display method comprising:
    setting a reference viewpoint in the movable body;
    setting a position of the display area of the virtual image to include a given distance range in the scenery from the reference viewpoint so that a difference between a first convergence angle to a target object present in the given distance range and a second convergence angle to the virtual image displayed in the display area on the display surface of the transmissive reflector is at most one degree;
    displaying the virtual image in the display area having the set position.

* * * * *